US008118666B2

(12) United States Patent
Nicely et al.

(10) Patent No.: US 8,118,666 B2
(45) Date of Patent: Feb. 21, 2012

(54) GAMING SYSTEM, GAMING DEVICES, AND METHOD FOR PROVIDING AN ENHANCED MULTIPLE-PLAYER BONUS REDEMPTION GAME

(75) Inventors: Mark C. Nicely, Daly City, CA (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 861 days.

(21) Appl. No.: 12/173,604

(22) Filed: Jul. 15, 2008

(65) Prior Publication Data

US 2010/0016065 A1 Jan. 21, 2010

(51) Int. Cl.
*G06F 19/00* (2006.01)

(52) U.S. Cl. ................. 463/25; 463/42; 463/16; 463/17

(58) Field of Classification Search ........................ None
See application file for complete search history.

(56) References Cited

U.S. PATENT DOCUMENTS 3,167,313 A 1/1965 Davenport et al.
3,281,149 A 10/1966 Miller
4,003,578 A 1/1977 Jones
4,103,895 A 8/1978 Pressman et al.
4,182,515 A 1/1980 Nemeth
4,277,067 A 7/1981 Gettleman
4,323,242 A 4/1982 Rosenfeld
4,339,798 A 7/1982 Hedges et al.
4,511,143 A 4/1985 Sankrithi
4,669,731 A 6/1987 Clarke
4,743,024 A 5/1988 Helm et al.
4,775,155 A 10/1988 Lees
4,805,907 A 2/1989 Hagiwara
4,836,546 A 6/1989 DiRe et al.
4,837,728 A 6/1989 Barrie et al.
4,850,592 A 7/1989 Winter
4,856,787 A 8/1989 Itkis
4,906,005 A 3/1990 Manabe
5,083,271 A 1/1992 Thacher et al.
5,083,800 A 1/1992 Lockton (Continued)

FOREIGN PATENT DOCUMENTS

DE 2938307 4/1981

(Continued)

OTHER PUBLICATIONS

"Slots and Bingo . . . the Best of Both," Brochure published by Casino Data Systems, 1998.

(Continued)

*Primary Examiner* — Paul A. D'Agostino
(74) *Attorney, Agent, or Firm* — K&L Gates LLP

(57) ABSTRACT

A gaming system and methods provide a plurality of gaming devices configured to operate a multiple-player bonus or secondary game. Each gaming device of the gaming system generates targets upon occurrences of target-generation events. Each gaming device also generates collectors upon occurrences of collector-generating events. The collectors may be used in conjunction with the aforementioned targets to obtain awards in a bonus sequence as described. Upon the occurrence of a redemption event at one of the plurality of gaming devices, the gaming device provides all players playing at one of the gaming devices in the gaming system the opportunity to redeem all accumulated collectors and targets in a bonus sequence. In the bonus sequence, the gaming system determines any awards associated with the redemption of accumulated collectors and targets and provides them to the players.

66 Claims, 17 Drawing Sheets

U.S. PATENT DOCUMENTS

| | | | |
|---|---|---|---|
| 5,152,529 | A | 10/1992 | Okada |
| 5,178,395 | A | 1/1993 | Lovell |
| 5,186,460 | A | 2/1993 | Fongeallaz et al. |
| 5,205,555 | A | 4/1993 | Hamann |
| 5,242,163 | A | 9/1993 | Fulton |
| 5,259,616 | A | 11/1993 | Bergmann |
| 5,275,400 | A | 1/1994 | Weingardt et al. |
| 5,299,810 | A | 4/1994 | Pierce et al. |
| 5,333,868 | A | 8/1994 | Goldfarb |
| 5,355,442 | A | 10/1994 | Paglieroni et al. |
| 5,393,057 | A | 2/1995 | Marnell, II |
| 5,411,271 | A | 5/1995 | Mirando |
| 5,486,005 | A | 1/1996 | Neal |
| 5,536,016 | A | 7/1996 | Thompson |
| 5,560,603 | A | 10/1996 | Seelig et al. |
| 5,564,700 | A | 10/1996 | Celona |
| 5,564,701 | A | 10/1996 | Dettor |
| 5,566,942 | A | 10/1996 | Elum |
| 5,569,083 | A | 10/1996 | Fioretti |
| 5,580,309 | A | 12/1996 | Piechowiak et al. |
| 5,611,730 | A | 3/1997 | Weiss |
| 5,630,753 | A | 5/1997 | Fuchs |
| 5,639,089 | A | 6/1997 | Matsumoto et al. |
| 5,645,486 | A | 7/1997 | Nagao et al. |
| 5,647,798 | A | 7/1997 | Falciglia |
| 5,655,961 | A | 8/1997 | Acres et al. |
| 5,664,998 | A | 9/1997 | Seelig et al. |
| 5,722,891 | A | 3/1998 | Inoue |
| 5,741,183 | A | 4/1998 | Acres et al. |
| 5,752,882 | A | 5/1998 | Acres et al. |
| 5,758,875 | A | 6/1998 | Giacalone, Jr. |
| 5,761,647 | A | 6/1998 | Boushy |
| 5,769,716 | A | 6/1998 | Saffari et al. |
| 5,772,509 | A | 6/1998 | Weiss |
| 5,779,242 | A | 7/1998 | Kaufmann |
| 5,779,544 | A | 7/1998 | Seelig et al. |
| 5,779,549 | A | 7/1998 | Walker et al. |
| 5,788,573 | A | 8/1998 | Baerlocher et al. |
| 5,813,672 | A | 9/1998 | Loud, Jr. |
| 5,820,459 | A | 10/1998 | Acres et al. |
| 5,823,874 | A | 10/1998 | Adams |
| 5,833,536 | A | 11/1998 | Davids et al. |
| 5,833,537 | A | 11/1998 | Barrie |
| 5,836,817 | A | 11/1998 | Acres et al. |
| 5,836,818 | A | 11/1998 | Jones et al. |
| 5,848,932 | A | 12/1998 | Adams |
| 5,851,148 | A | 12/1998 | Brune et al. |
| D404,436 | S | 1/1999 | McGahn et al. |
| 5,855,514 | A | 1/1999 | Kamille |
| 5,855,515 | A | 1/1999 | Pease et al. |
| 5,876,284 | A | 3/1999 | Acres et al. |
| 5,882,261 | A | 3/1999 | Adams |
| 5,902,983 | A | 5/1999 | Crevelt et al. |
| 5,911,418 | A | 6/1999 | Adams |
| 5,924,927 | A | 7/1999 | Matsuura et al. |
| 5,931,467 | A | 8/1999 | Kamille |
| 5,934,999 | A | 8/1999 | Valdez |
| 5,935,002 | A | 8/1999 | Falciglia |
| 5,947,820 | A | 9/1999 | Morro et al. |
| 5,951,012 | A | 9/1999 | Feola |
| 5,951,397 | A | 9/1999 | Dickinson |
| 5,961,384 | A | 10/1999 | Robinson |
| 5,976,015 | A | 11/1999 | Seelig et al. |
| 5,980,384 | A | 11/1999 | Barrie |
| 5,997,400 | A | 12/1999 | Seelig et al. |
| 5,997,401 | A | 12/1999 | Crawford |
| 6,012,982 | A | 1/2000 | Piechowiak et al. |
| 6,015,346 | A | 1/2000 | Bennett |
| 6,019,369 | A | 2/2000 | Nakagawa et al. |
| 6,033,307 | A | 3/2000 | Vancura |
| 6,039,648 | A | 3/2000 | Guinn et al. |
| 6,050,895 | A | 4/2000 | Luciano, Jr. et al. |
| 6,059,289 | A | 5/2000 | Vancura |
| 6,059,658 | A | 5/2000 | Mangano et al. |
| 6,077,162 | A | 6/2000 | Weiss |
| 6,082,887 | A | 7/2000 | Feuer et al. |
| 6,089,976 | A | 7/2000 | Schneider et al. |
| 6,089,978 | A | 7/2000 | Adams |
| 6,089,980 | A | 7/2000 | Gauselmann |
| 6,102,400 | A | 8/2000 | Scott et al. |
| 6,102,798 | A | 8/2000 | Bennett |
| 6,110,043 | A | 8/2000 | Olsen |
| 6,113,098 | A | 9/2000 | Adams |
| 6,120,377 | A | 9/2000 | McGinnis, Sr. et al. |
| 6,123,335 | A | 9/2000 | Adkins |
| 6,126,542 | A | 10/2000 | Fier |
| 6,134,556 | A | 10/2000 | Shin |
| 6,135,884 | A | 10/2000 | Hedrick et al. |
| 6,135,885 | A | 10/2000 | Lermusiaux |
| 6,142,872 | A | 11/2000 | Walker et al. |
| 6,146,273 | A | 11/2000 | Olsen |
| 6,159,095 | A | 12/2000 | Frohm et al. |
| 6,159,097 | A | 12/2000 | Gura |
| 6,165,071 | A | 12/2000 | Weiss |
| 6,165,072 | A | 12/2000 | Davis et al. |
| 6,168,521 | B1 | 1/2001 | Luciano et al. |
| 6,168,523 | B1 | 1/2001 | Piechowiak et al. |
| 6,186,894 | B1 | 2/2001 | Mayeroff |
| 6,190,255 | B1 | 2/2001 | Thomas et al. |
| 6,203,010 | B1 | 3/2001 | Jorasch et al. |
| 6,203,429 | B1 | 3/2001 | Demar et al. |
| 6,206,782 | B1 | 3/2001 | Walker et al. |
| 6,210,275 | B1 | 4/2001 | Olsen |
| 6,210,277 | B1 | 4/2001 | Stefan |
| 6,213,876 | B1 | 4/2001 | Moore, Jr. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,224,486 | B1 | 5/2001 | Walker et al. |
| 6,231,442 | B1 | 5/2001 | Mayeroff |
| 6,231,445 | B1 | 5/2001 | Acres |
| 6,254,481 | B1 | 7/2001 | Jaffe |
| 6,261,177 | B1 | 7/2001 | Bennett |
| 6,273,420 | B1 | 8/2001 | Brooks |
| 6,287,202 | B1 | 9/2001 | Pascal et al. |
| 6,290,600 | B1 | 9/2001 | Glasson |
| 6,309,299 | B1 | 10/2001 | Weiss |
| 6,309,300 | B1 | 10/2001 | Glavich |
| 6,309,307 | B1 | 10/2001 | Krause et al. |
| 6,312,332 | B1 | 11/2001 | Walker et al. |
| 6,315,660 | B1 | 11/2001 | DeMar et al. |
| 6,315,664 | B1 | 11/2001 | Baerlocher et al. |
| 6,319,124 | B1 | 11/2001 | Baerlocher et al. |
| 6,328,649 | B1 | 12/2001 | Randall et al. |
| 6,338,678 | B1 | 1/2002 | Seelig et al. |
| 6,346,043 | B1 | 2/2002 | Colin et al. |
| 6,347,996 | B1 | 2/2002 | Gilmore et al. |
| 6,364,767 | B1 | 4/2002 | Brossard et al. |
| 6,398,644 | B1 | 6/2002 | Perrie et al. |
| 6,406,369 | B1 | 6/2002 | Baerlocher et al. |
| 6,425,824 | B1 | 7/2002 | Baerlocher et al. |
| 6,439,995 | B1 | 8/2002 | Hughs-Baird et al. |
| 6,443,837 | B1 | 9/2002 | Jaffe et al. |
| 6,450,883 | B1 | 9/2002 | O'Halloran |
| 6,461,241 | B1 | 10/2002 | Webb et al. |
| 6,494,785 | B1 | 12/2002 | Gerrard et al. |
| 6,508,709 | B1 | 1/2003 | Karmarkar |
| 6,511,375 | B1 | 1/2003 | Kaminkow |
| 6,514,141 | B1 | 2/2003 | Kaminkow et al. |
| 6,533,273 | B2 | 3/2003 | Cole et al. |
| 6,558,254 | B2 | 5/2003 | Baelocher et al. |
| 6,572,469 | B2 | 6/2003 | Klitsner et al. |
| 6,572,473 | B1 | 6/2003 | Baerlocher |
| 6,582,307 | B2 | 6/2003 | Webb |
| 6,589,117 | B1 | 7/2003 | Moritome et al. |
| 6,595,854 | B2 | 7/2003 | Hughs-Baird et al. |
| 6,599,185 | B1 | 7/2003 | Kaminkow et al. |
| 6,602,136 | B1 | 8/2003 | Baerlocher et al. |
| 6,602,137 | B2 | 8/2003 | Kaminkow et al. |
| 6,607,438 | B2 | 8/2003 | Baerlocher et al. |
| 6,612,574 | B1 | 9/2003 | Cole et al. |
| 6,612,575 | B1 | 9/2003 | Cole et al. |
| 6,632,141 | B2 | 10/2003 | Webb et al. |
| 6,638,164 | B2 | 10/2003 | Randall et al. |
| 6,644,664 | B2 | 11/2003 | Muir et al. |
| 6,645,071 | B2 | 11/2003 | Perrie et al. |
| 6,652,378 | B2 | 11/2003 | Cannon et al. |

6,656,040 B1 12/2003 Brossman et al.
6,676,516 B2 1/2004 Baerlocher et al.
6,676,521 B1 1/2004 La Mura et al.
6,688,975 B2 2/2004 Baerlocher et al.
6,688,977 B1 2/2004 Baerlocher et al.
6,692,356 B2 2/2004 Baerlocher et al.
6,722,976 B2 4/2004 Adams
6,722,981 B2 4/2004 Kaminkow et al.
6,722,982 B2 4/2004 Kaminkow et al.
6,722,983 B2 4/2004 Kaminkow et al.
6,726,565 B2 4/2004 Hughs-Baird
6,733,386 B2 5/2004 Cuddy et al.
6,743,096 B2 6/2004 Allendorf et al.
6,743,102 B1 * 6/2004 Fiechter et al. ................. 463/42
6,749,504 B2 6/2004 Hughs-Baird
6,758,747 B2 7/2004 Baerlocher
6,769,983 B2 8/2004 Slomiany
6,780,107 B2 8/2004 Baerlocher et al.
6,780,110 B2 8/2004 Baerlocher et al.
6,783,457 B2 8/2004 Hughs-Baird et al.
6,796,899 B2 9/2004 Baerlocher
6,800,026 B2 10/2004 Cannon
6,814,664 B2 11/2004 Baerlocher et al.
6,817,944 B2 11/2004 Kaminkow et al.
6,837,793 B2 1/2005 McClintic
6,840,856 B2 1/2005 Stern
6,843,722 B2 1/2005 Webb
6,863,606 B1 3/2005 Berg et al.
6,866,584 B2 3/2005 Michaelson
6,875,108 B1 4/2005 Hughs-Baird
6,880,168 B2 4/2005 Maehiro
6,887,154 B1 5/2005 Luciano, Jr. et al.
6,890,255 B2 5/2005 Jarvis et al.
6,899,620 B2 5/2005 Kaminkown et al.
6,902,478 B2 6/2005 McClintic
6,905,406 B2 6/2005 Kaminkow et al.
6,913,533 B2 7/2005 Cuddy et al.
6,918,830 B2 7/2005 Baerlocher
6,932,701 B2 8/2005 Glavich et al.
6,935,947 B1 * 8/2005 Singer et al. .................... 463/16
6,939,224 B2 9/2005 Palmer et al.
6,958,013 B2 10/2005 Miereau et al.
6,966,833 B2 11/2005 Kaminkow et al.
6,966,834 B1 11/2005 Johnson
6,971,954 B2 12/2005 Randall et al.
6,988,946 B2 1/2006 Michaleson
6,988,948 B2 1/2006 Perrie et al.
6,995,751 B2 2/2006 Falvo
6,996,833 B1 2/2006 Olson et al.
7,011,581 B2 3/2006 Cole et al.
7,029,395 B1 4/2006 Baerlocher
7,037,191 B2 5/2006 Rodgers et al.
7,037,192 B2 5/2006 Baerlocher et al.
7,040,984 B2 5/2006 Mead
7,056,214 B2 6/2006 Miereau et al.
7,077,744 B2 7/2006 Cannon
7,081,050 B2 7/2006 Tarantino
7,104,888 B2 9/2006 Miereau et al.
7,112,137 B2 9/2006 Baerlocher et al.
7,121,942 B2 10/2006 Baerlocher
7,158,798 B2 1/2007 Lee et al.
7,160,186 B2 1/2007 Cuddy et al.
7,160,188 B2 1/2007 Kaminkow et al.
7,169,041 B2 1/2007 Tessmer et al.
7,169,042 B2 1/2007 Muir et al.
7,169,044 B2 1/2007 Baerlocher et al.
7,172,506 B2 2/2007 Baerlocher et al.
7,175,523 B2 2/2007 Gilmore et al.
7,182,689 B2 2/2007 Hughs-Baird et al.
7,192,348 B2 3/2007 Brosnan
7,198,570 B2 4/2007 Rodgers et al.
7,201,657 B2 4/2007 Baerlocher et al.
7,223,172 B2 5/2007 Baerlocher et al.
7,235,011 B2 6/2007 Randall et al.
7,240,093 B1 7/2007 Danieli et al.
7,257,714 B1 8/2007 Shen
7,264,545 B2 9/2007 Maya et al.
7,291,069 B2 11/2007 Michaelson et al.
7,300,348 B2 11/2007 Kaminkow et al.
7,303,469 B2 12/2007 Kaminkow et al.
7,311,598 B2 12/2007 Kaminkow et al.
7,311,604 B2 12/2007 Kaminkow et al.
7,311,608 B1 12/2007 Danieli et al.
7,314,408 B2 1/2008 Cannon
7,314,409 B2 1/2008 Maya et al.
7,314,410 B2 1/2008 Baerlocher et al.
7,318,773 B2 1/2008 Baerlocher
7,326,115 B2 2/2008 Baerlocher
7,338,367 B2 3/2008 Kaminkow et al.
7,338,369 B2 3/2008 Mierau et al.
7,351,140 B2 4/2008 Wolf et al.
7,361,087 B2 4/2008 Baerlocher et al.
7,393,280 B2 7/2008 Cannon
7,422,213 B2 9/2008 Katz et al.
7,427,236 B2 9/2008 Kaminkow et al.
7,448,949 B2 11/2008 Kaminkow et al.
2001/0016513 A1 8/2001 Muir et al.
2002/0016200 A1 2/2002 Baerlocher et al.
2002/0039923 A1 4/2002 Cannon et al.
2002/0052232 A1 5/2002 Kaminkow
2002/0128055 A1 9/2002 Adams
2002/0177483 A1 11/2002 Cannon
2003/0013514 A1 1/2003 Cregan et al.
2003/0036422 A1 2/2003 Baerlocher et al.
2003/0036424 A1 2/2003 Baerlocher
2003/0040358 A1 2/2003 Rothkranz et al.
2003/0060264 A1 3/2003 Chilton et al.
2003/0064773 A1 4/2003 Baerlocher et al.
2003/0078091 A1 4/2003 Brandstetter et al.
2003/0078096 A1 4/2003 Kaminkow et al.
2003/0104853 A1 6/2003 Tessmer et al.
2003/0114220 A1 6/2003 McClintic
2003/0119581 A1 6/2003 Cannon et al.
2003/0125107 A1 7/2003 Cannon
2003/0127793 A1 7/2003 Adams
2003/0153378 A1 8/2003 Schlegel et al.
2003/0157982 A1 8/2003 Gerrard et al.
2003/0162578 A1 8/2003 Baerlocher et al.
2004/0048644 A1 3/2004 Gerrard et al.
2004/0048649 A1 3/2004 Peterson et al.
2004/0053665 A1 3/2004 Baerlocher
2004/0082373 A1 4/2004 Cole et al.
2004/0111358 A1 6/2004 Lange et al.
2004/0152520 A1 8/2004 Shinoda
2004/0166923 A1 8/2004 Michaelson et al.
2004/0224770 A1 11/2004 Wolf et al.
2004/0229671 A1 11/2004 Stronach et al.
2004/0235552 A1 * 11/2004 Gauselmann .................. 463/16
2004/0242315 A1 12/2004 Paulsen et al.
2004/0248639 A1 12/2004 Slomiany
2005/0020340 A1 1/2005 Cannon
2005/0020351 A1 1/2005 Baerlocher et al.
2005/0020352 A1 1/2005 Chilton et al.
2005/0026687 A1 2/2005 Watanabe
2005/0033461 A1 2/2005 Gerrard et al.
2005/0054404 A1 3/2005 Baerlocher
2005/0054405 A1 3/2005 Baerlocher et al.
2005/0054415 A1 3/2005 Kaminkow et al.
2005/0054416 A1 3/2005 Hostetler et al.
2005/0054435 A1 3/2005 Rodgers et al.
2005/0059456 A1 3/2005 Mead et al.
2005/0059461 A1 3/2005 Ching et al.
2005/0064928 A1 3/2005 Baerlocher et al.
2005/0096123 A1 5/2005 Cregan et al.
2005/0101372 A1 5/2005 Mierau et al.
2005/0137014 A1 6/2005 Vetelainen
2005/0181860 A1 8/2005 Nguyen et al.
2005/0192081 A1 9/2005 Marks et al.
2005/0197180 A1 9/2005 Kaminkow et al.
2005/0202875 A1 9/2005 Murphy et al.
2005/0218591 A1 10/2005 Torigian et al.
2005/0227754 A1 10/2005 Kaminkow et al.
2006/0025195 A1 2/2006 Pennington et al.
2006/0030401 A1 2/2006 Mead et al.
2006/0030959 A1 2/2006 Duhamel
2006/0035696 A1 2/2006 Walker et al.
2006/0040732 A1 2/2006 Baerlocher et al.
2006/0046821 A1 3/2006 Kaminkow et al.

| | | | |
|---|---|---|---|
| 2006/0046822 A1 | 3/2006 | Kaminkow et al. | |
| 2006/0068882 A1 | 3/2006 | Baerlocher et al. | |
| 2006/0068893 A1 | 3/2006 | Jaffe et al. | |
| 2006/0073874 A1 | 4/2006 | Cregan et al. | |
| 2006/0079317 A1 | 4/2006 | Flemming et al. | |
| 2006/0084500 A1 | 4/2006 | Baerlocher et al. | |
| 2006/0089194 A1 | 4/2006 | Joshi et al. | |
| 2006/0121971 A1 | 6/2006 | Slomiany et al. | |
| 2006/0157934 A1 | 7/2006 | Yoseloff et al. | |
| 2006/0183528 A1 | 8/2006 | Rodgers et al. | |
| 2006/0199628 A1 | 9/2006 | Rodgers et al. | |
| 2006/0217170 A1 | 9/2006 | Roireau | |
| 2006/0246977 A1 | 11/2006 | Cannon | |
| 2006/0247011 A1 | 11/2006 | Gagner | |
| 2006/0287057 A1 | 12/2006 | Osawa | |
| 2007/0015566 A1 | 1/2007 | Baerlocher et al. | |
| 2007/0015585 A1 | 1/2007 | Sartini | |
| 2007/0032285 A1 | 2/2007 | Wolf | |
| 2007/0054732 A1 | 3/2007 | Baerlocher | |
| 2007/0054733 A1 | 3/2007 | Baerlocher | |
| 2007/0060271 A1 | 3/2007 | Cregan et al. | |
| 2007/0060300 A1 | 3/2007 | Baerlocher | |
| 2007/0077990 A1 | 4/2007 | Cuddy et al. | |
| 2007/0077997 A1 | 4/2007 | Johnson | |
| 2007/0087809 A1 | 4/2007 | Baerlocher | |
| 2007/0099696 A1* | 5/2007 | Nguyen et al. | 463/25 |
| 2007/0105620 A1 | 5/2007 | Cuddy et al. | |
| 2007/0111783 A1 | 5/2007 | Cuddy et al. | |
| 2007/0117606 A1 | 5/2007 | Baerlocher et al. | |
| 2007/0117608 A1 | 5/2007 | Roper et al. | |
| 2007/0123353 A1 | 5/2007 | Smith | |
| 2007/0129131 A1 | 6/2007 | Kaminkow et al. | |
| 2007/0149269 A1 | 6/2007 | Benbrahim | |
| 2007/0155485 A1 | 7/2007 | Cuddy et al. | |
| 2007/0167211 A1 | 7/2007 | Rodgers et al. | |
| 2007/0167217 A1 | 7/2007 | Kaminkow et al. | |
| 2007/0173325 A1 | 7/2007 | Shaw et al. | |
| 2007/0184896 A1 | 8/2007 | Dickerson | |
| 2007/0218997 A1 | 9/2007 | Cho | |
| 2007/0243936 A1 | 10/2007 | Binenstock et al. | |
| 2007/0265060 A1 | 11/2007 | Hornik et al. | |
| 2007/0298858 A1 | 12/2007 | Toneguzzo | |
| 2007/0298874 A1 | 12/2007 | Baerlocher et al. | |
| 2007/0298875 A1 | 12/2007 | Baerlocher et al. | |
| 2008/0004102 A1 | 1/2008 | Kojima | |
| 2008/0015006 A1* | 1/2008 | George et al. | 463/17 |
| 2008/0020822 A1 | 1/2008 | Cuddy et al. | |
| 2008/0020846 A1 | 1/2008 | Vasquez | |
| 2008/0064502 A1 | 3/2008 | Schlottmann et al. | |
| 2008/0076514 A1 | 3/2008 | Baerlocher et al. | |
| 2008/0076515 A1 | 3/2008 | Baerlocher et al. | |
| 2008/0076517 A1 | 3/2008 | Baerlocher et al. | |
| 2008/0076552 A1 | 3/2008 | Baerlocher et al. | |
| 2008/0108404 A1 | 5/2008 | Iddings et al. | |
| 2008/0108429 A1 | 5/2008 | Davis et al. | |
| 2008/0113735 A1 | 5/2008 | Maya | |
| 2008/0146322 A1 | 6/2008 | Hardy et al. | |
| 2008/0146323 A1 | 6/2008 | Hardy et al. | |
| 2008/0146345 A1 | 6/2008 | Hardy et al. | |
| 2008/0176650 A1 | 7/2008 | Wolf et al. | |
| 2008/0182662 A1 | 7/2008 | Yoshizawa | |
| 2008/0214310 A1 | 9/2008 | Brunet De Courssou et al. | |
| 2008/0227549 A1 | 9/2008 | Itskov et al. | |
| 2008/0227552 A1 | 9/2008 | Shimomura et al. | |
| 2008/0280670 A1 | 11/2008 | Sakuma | |
| 2008/0311979 A1* | 12/2008 | Walker et al. | 463/25 |

FOREIGN PATENT DOCUMENTS

| | | |
|---|---|---|
| EP | 0 449 433 | 10/1991 |
| EP | 0 464 935 | 1/1992 |
| EP | 0 945 837 | 9/1999 |
| EP | 1 063 622 | 12/2000 |
| EP | 1 199 689 | 4/2002 |
| EP | 1 298 607 | 4/2003 |
| EP | 1 531 434 | 5/2005 |
| EP | 1 764 753 | 3/2007 |
| EP | 1 779 908 | 5/2007 |
| GB | 2066991 | 7/1981 |
| GB | 2072395 | 9/1981 |
| GB | 2084371 | 4/1982 |
| GB | 2096376 | 10/1982 |
| GB | 2137392 | 10/1984 |
| GB | 2161008 | 1/1986 |
| GB | 2170938 | 8/1986 |
| GB | 2182186 | 5/1987 |
| GB | 2191030 | 12/1987 |
| GB | 2201821 | 9/1988 |
| GB | 2202984 | 10/1988 |
| GB | 2226436 | 6/1990 |
| GB | 2242300 | 9/1991 |
| JP | 5131044 | 5/1993 |
| WO | WO 98/00210 | 1/1998 |
| WO | WO 00/12186 | 3/2000 |
| WO | WO 00/20082 | 4/2000 |
| WO | WO 00/43087 | 7/2000 |
| WO | WO 02/096528 | 12/2002 |
| WO | WO 03/010725 | 2/2003 |
| WO | WO 03/026757 | 4/2003 |
| WO | WO 03/083796 | 10/2003 |
| WO | WO 2005/110570 | 11/2005 |
| WO | WO 2006/063054 | 6/2006 |
| WO | WO 2007/011502 | 1/2007 |
| WO | WO 2007/030641 | 3/2007 |
| WO | WO 2007/030733 | 3/2007 |
| WO | WO 2007/030801 | 3/2007 |
| WO | WO 2007/087078 | 8/2007 |
| WO | WO 2008/022323 | 2/2008 |
| WO | WO 2008/027062 | 3/2008 |
| WO | WO 2008/109987 | 9/2008 |

OTHER PUBLICATIONS

Bueschel, Richard M., "Slots 1," Entries about Mills Futurity Bell Machine and Mills Bonus Bell Machine, 1978, pp. 136, 142.
Cosmic Encounter—Science Fiction Themed Strategy Board Game—entry, http://en.wikipedia.org/wiki/Cosmic_encounter (retrieved Jan. 5, 2009).
Cosmic Encounter by Avalon—Science Fiction Themed Strategy Board Game—Board Game Rule's (2000).
Fey, Marshall, "Slot Machines," Mills Bonus Bell and Discount Wheels Entries, 1983, p. 126, 150.
IGT Gaming System Brochure, IGT (Available by Oct. 2006).
Legato, Frank, "Instant Slotto," Strictly Slots (Apr. 2001).
Intergame Magazine, Jun. 1995, cover and pp. 91, 101.
Jackpot Bingo published by CDS.com printed on Apr. 12, 2001.
Jewel in the Crown Brochure published by Igt in 1999.
Match Reel Game Bonus Description published by Igt, available by to Oct. 2006.
Raining Diamonds Advertisement, Sierra Design Group (2001).
Scarne, John, Scarne's New Complete Guide to Gambling, Simon & Schuster, pp. 162-167 (1974).
Silver Strike Advertisement and Pictures, Anchor Gaming (1997).

* cited by examiner

Legend
X - Player A Targets
X - Player B Targets
X - Player C Targets
X = Target Value
PLAYER A - COLLECTORS
Player A got 1 new target and 1 target expired, displayed as squares
PLAYER B - COLLECTORS
Player B got 2 new targets and 8 new collectors and 1 target expired, displayed as circles
PLAYER C - COLLECTORS
Player C got 5 new targets and 3 targets expired, displayed as triangles
108
500
502
504
506
508
510
540
560
580
600
604
606
608
610a
610b
640
660
680
740
760
780
90
50
40
25
10
5
20
15

Player A

GAMING SYSTEM, GAMING DEVICES, AND METHOD FOR PROVIDING AN ENHANCED MULTIPLE-PLAYER BONUS REDEMPTION GAME

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain known gaming machines are configured such that the players of these gaming machines compete for one or more awards such as progressive awards. Such progressive awards are typically displayed by one or more secondary display devices above the bank or group of gaming machines or in a separate display area of each of the gaming devices. Other known gaming machines or gaming systems are configured such that the players share with each other or can each win one or more awards. These awards are sometimes displayed by one or more secondary display devices above the bank or group of gaming machines. These types of group or community gaming systems (where the players are either competing for awards, where the players are sharing awards, or where the players are winning awards at the same time) are growing in popularity. Certain of these group or community gaming systems create an aura of excitement and entertainment for the people playing the gaming machines of the system and for people watching play.

For many such community gaming systems, certain players perceive an advantage when playing a gaming machine at a fully occupied or substantially fully occupied bank of gaming machines. When the gaming machines of such a bank of gaming machines are unoccupied or nearly unoccupied, such community gaming systems may deter certain players from playing at such a bank. For certain players, it is unclear whether other player activity at the gaming machines of various gaming systems is helpful or harmful to the individual player's chances of winning awards. There is a continuing need to provide community gaming systems which provide little to no disadvantage (actual or perceived), regardless of the quantity of players playing gaming machines of the gaming system and regardless of the magnitude of wagers being made by the players. There is a further continuing need to increase this excitement and entertainment for people playing and people watching play of group or community gaming systems. There is also need for new ways of providing better gaming experiences and environments at gaming machines. There is a further need for increasing social interactivity among people playing and people watching play of gaming machines which are or are not part of a group or community gaming system.

SUMMARY

The present disclosure generally relates to gaming systems, gaming devices, and methods which provide a multiple-player bonus redemption game, and more particularly relates to a gaming system providing a plurality of gaming devices which are in communication with or linked by a controller configured to operate a multiple-player bonus or secondary game. In one embodiment, each gaming device generates one or more targets upon occurrences of target-generation events. The gaming system causes the display of any generated targets. In one form, such targets represent potential future bonus redemption opportunities. Each gaming device also generates one or more collectors upon occurrences of collector-generation events. The gaming system accumulates and causes the display of any generated collectors. The generated collectors are used or redeemed in conjunction with the generated targets to provide one or more bonus awards for one or more of the gaming devices during a bonus sequence.

In one embodiment, upon the occurrence of a redemption event, the bonus sequence begins and the gaming system provides the players at each of the participating gaming devices the opportunity to redeem one or more accumulated targets and/or one or more accumulated collectors in a community bonus sequence. The community bonus sequence enables the players at each of the gaming devices of the gaming system to simultaneously participate in a bonus sequence and to win awards available to any of the players of the gaming system. During the bonus sequence, the gaming system causes the coupling of at least one of the accumulated collectors with at least one of the accumulated targets. In various embodiments, the gaming system randomly determines which generated collectors and which generated targets to couple. In one embodiment, the determination of the couplings of targets and collectors is based on a probability associated with each target, wherein the probability is weighted depending on a target value. In various embodiments, the gaming system provides bonus awards based on the target values of any coupled targets and collectors. In one embodiment, each collector is configured to couple with exactly one target. In alternative embodiments, at least one collector is configured to couple with more than one target. In another embodiment, at least one collector does not couple with any target, such as when the gaming system has accumulated more collectors than targets. In one embodiment, for a coupled target and collector, the gaming system provides a bonus award to the gaming device that generated the coupled target. In another embodiment, for a coupled target and collector, the gaming system provides a bonus award to the gaming device that generated the coupled collector.

In one embodiment, each of the gaming devices is configured to provide a base or primary game operable upon a wager by a player. For each gaming device, one or more plays of the base or primary game results in one or more target-generation events. For each occurrence of a target-generation event, the gaming device at which the target-generation event occurred generates one or more player-specific targets. The gaming system accumulates these targets such that they are usable in a bonus event occurring in the future. In various embodiments, each target has a displayed target value or target award associated with it. In various embodiments, target-generation events occur when a player makes a wager on the base or primary game, occur after a passage of time, occur randomly, or occur based on a result of a play of the base or primary game. In one embodiment, the gaming system generates targets at a minimum or predetermined rate regardless of whether any players are making wagers at any of the gaming devices, with additional targets being generated based on the quantity and amounts of wagers placed by players at the gaming devices in the gaming system.

In different embodiments, the gaming system indicates the player with whom a generated target is associated by the color, shape, location, or size of each target, or by any other suitable indicators. In one embodiment, the gaming system generates targets for all players in a common geometric area displayed on one or more community displays. In this embodiment, the gaming system displays all the targets generated by each gaming device as intermingled and in close proximity with each other on at least one community display. In one embodiment, each player's targets are most densely concentrated near a symbol or indicia displayed as uniquely associated with each player.

In various embodiments, the gaming system or the gaming devices cause one or more collector-generation events. In one embodiment, when a collector-generation event occurs during a play of the base or primary game, the gaming device at which the collector-generation event occurred generates at least one collector. In one embodiment, the number of collectors generated for a collector-generation event is based on the particular winning symbol or winning symbol combination generated for a play of the base or primary game. For example, a collector-generation event based on a winning symbol combination including three symbols may result in the generation of fewer collectors than a collector-generation event based on a winning symbol combination including four symbols. In one embodiment, the number of collectors generated is based on a wager amount, such as a wager amount on the play of the game which generates the collector-generation event. In one such embodiment, the number of collectors generated is based on the sum of a player's wagers since a previous collector-generation event. The gaming system accumulates any generated collectors such that the collectors are usable in a future bonus event. In another embodiment, collector-generation events occur randomly, such as independent of any symbols generated during plays of the base game.

The gaming system accumulates and causes the display of any generated collectors such that the collectors are associated with the gaming device at which the collector-generation event occurred. For example, if a gaming device generates a collector-generation event resulting in one collector, the gaming system causes the display of the collector in an area of a community display designated as the collector accumulation area for that gaming device. In various embodiments, the gaming system indicates a player with whom collectors are associated by displaying the collectors using predetermined colors, shapes, locations or sizes, or by any other suitable indicators. In various embodiments, collector-generation events occur infrequently compared to the frequency of occurrences of target-generation events.

In one embodiment, the gaming system causes any accumulated targets and any accumulated collectors to exist for a predetermined time period. In one embodiment, the targets and collectors are represented by suitable symbols or indicia indicating they exist temporarily or for a finite amount of time. In this embodiment, an event such as a passage of time or a passage of a number of plays of the primary game results in the expiration of any accumulated targets and/or collectors.

In one embodiment, the gaming system displays the targets and collectors to indicate which targets and collectors are associated with which player, and the quantity of targets and collectors accumulated by each player. In one embodiment, the gaming system displays a symbol or indicia indicating a separation between the collectors associated with each of the gaming devices of the gaming system, and further indicating a separation between all of the accumulated collectors and all of the accumulated targets.

In one embodiment, the gaming system causes one or more redemption events to occur. In one embodiment, when a redemption event occurs, the controller initiates a community bonus sequence. In various embodiments, redemption events occur when a player at a gaming device in the gaming system receives a designated outcome in the base or primary game. In different embodiments, a redemption event occurs based on any suitable event which occurs in association with (a) one or more plays of one or more primary games, (b) one or more plays of one or more secondary games, and/or (c) one or more occurrences which are independent of any primary or secondary games played. The gaming system in one embodiment enables the players at each gaming device to participate in the community bonus sequence to redeem any accumulated collectors. In one such embodiment, upon triggering the community bonus sequence, the gaming system indicates the start of the bonus sequence by causing the community display to remove the separation indicia between the accumulated collectors and the accumulated targets.

In one embodiment, the gaming system couples each of any accumulated collectors with one of any accumulated targets. In this embodiment, each collector couples with a target, but each target may not couple with a collector. For each coupling, the gaming system provides an award to the player whose target coupled with any collector. The amount of the award provided for a coupled collector is based on the target value of the coupled target. For example, if a first player wagered on a play of the primary game that generated a target with a target value of five, and the gaming system couples a second player's collector with that target, the gaming system provides an award to the first player based on the target value of five. In one embodiment, the target value is not displayed prior to coupling. In one such embodiment, the target value is predetermined and is revealed at the time of coupling. In a further embodiment, the target value is selected from a range of target values at the time of coupling.

In one embodiment, the gaming system determines any bonus awards based on the targets with which one of the accumulated collectors has coupled and communicates the awards to each associated, participating gaming device. Each participating gaming device provides the appropriate total bonus award to the player. In one embodiment, the total award for each participating gaming device is equal to the sum of the target values of the coupled targets associated with that participating gaming device. In different embodiments, the total award for each participating gaming device is calculated based, in part, on the coupling of any collectors generated by that participating gaming device.

In various embodiments, the gaming system disclosed herein is configured to operate over a data network such as the internet. In one embodiment, the gaming system disclosed herein is configured to operate in a server-based environment. In this embodiment, the server is configured to accumulate and cause the display of a plurality of collectors and a plurality of targets, and to provide a bonus event if a redemption event occurs. In a further embodiment, the gaming system enables each of the plurality of players to access the server using a personal computer or other suitable network client terminal including at least one display device and at least one input device.

Accordingly, it is an advantage of the gaming system disclosed herein to provide a gaming system having a plurality of gaming devices wherein multiple awards can be provided simultaneously or substantially simultaneously to players based on a single occurrence of a bonus triggering event.

Another advantage is to provide a gaming system having a plurality of gaming devices which are each associated with a certain number of collectors and with a certain number of targets, and in which the odds of each gaming device earning higher-valued awards in the bonus sequence increase with the total number of collectors associated with the gaming devices of the gaming system.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
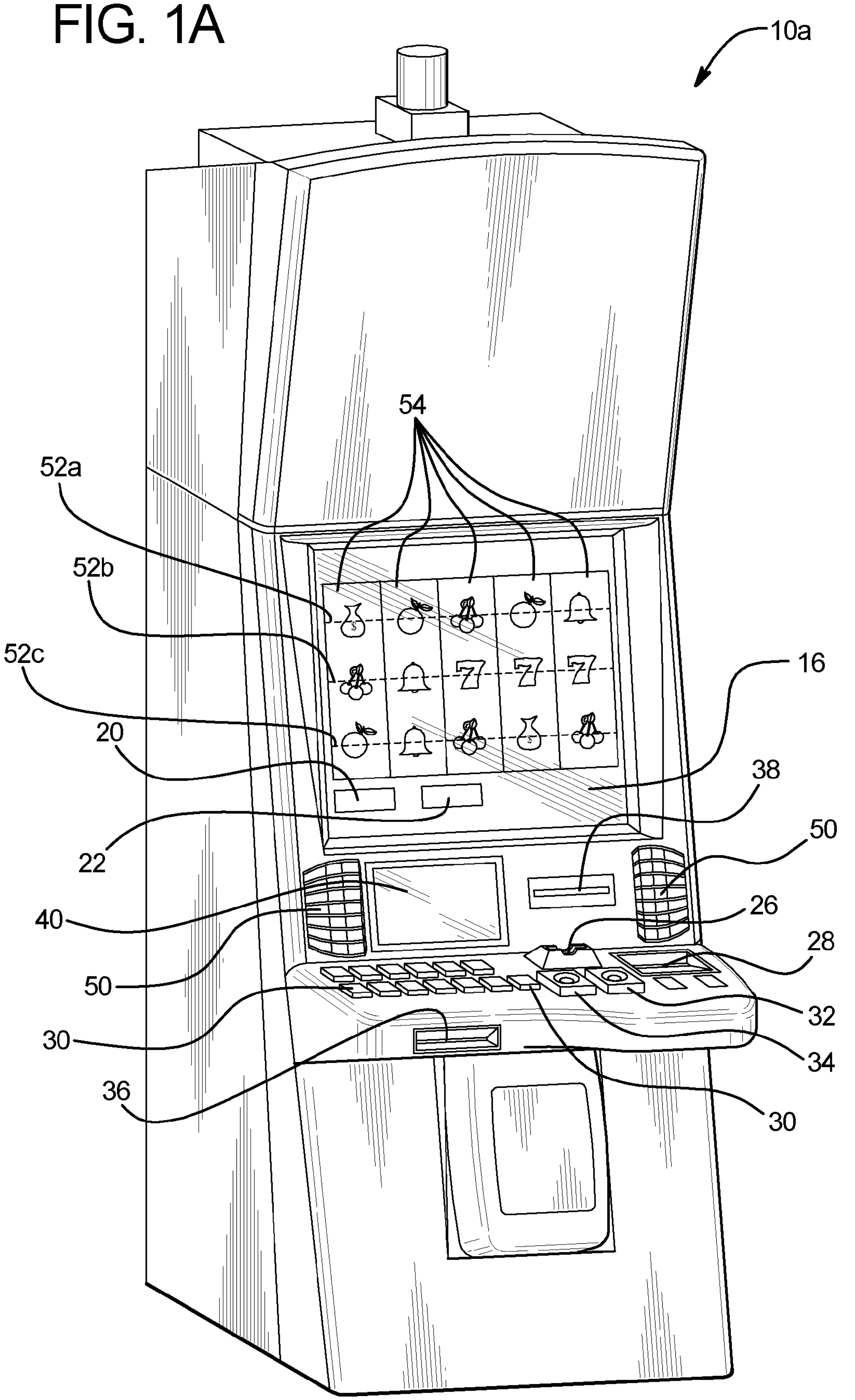
FIGS. 1A and 1B are perspective views of example alternative embodiments of the gaming device of the present disclosure.
Figure 1B:
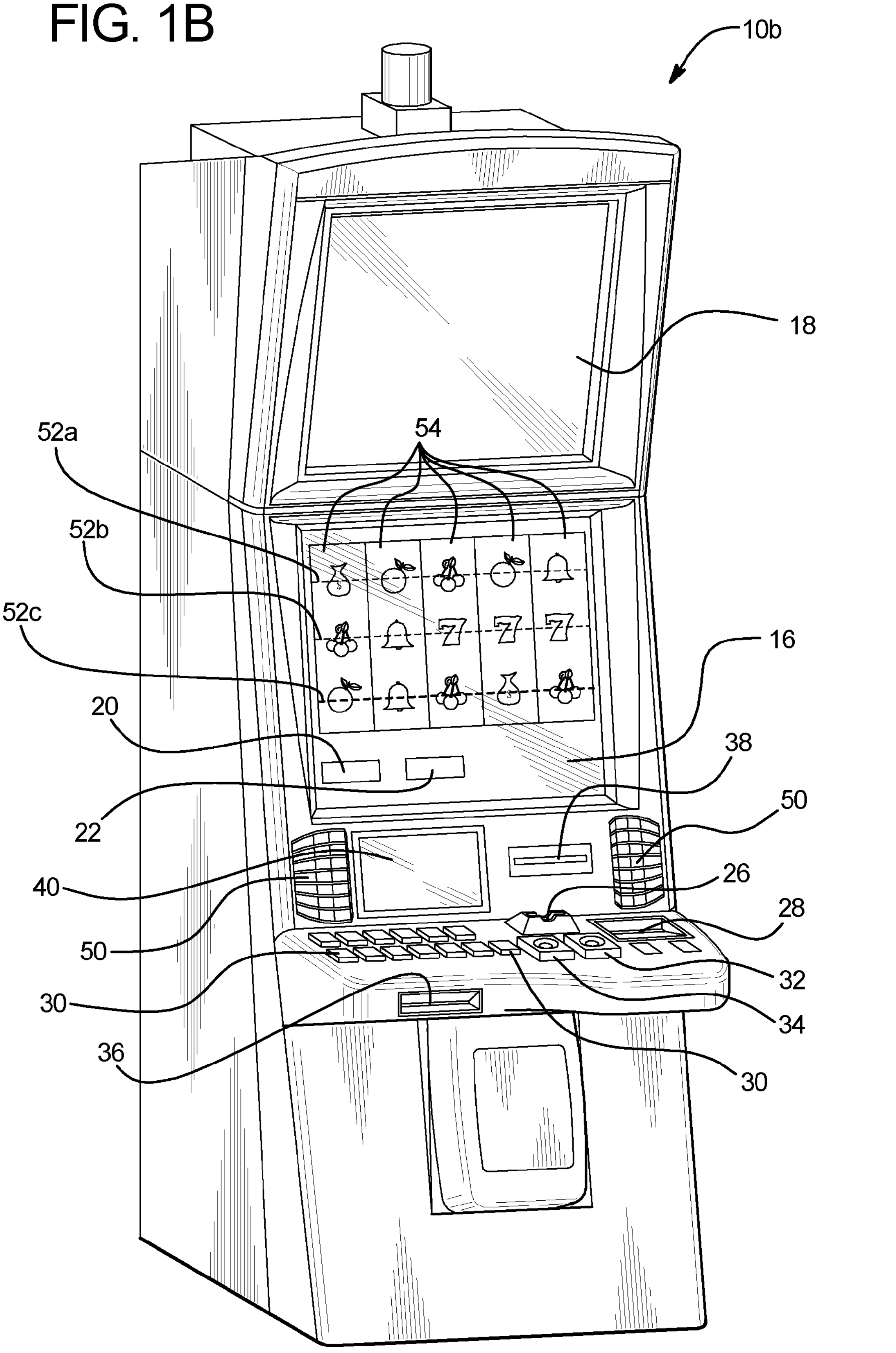

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
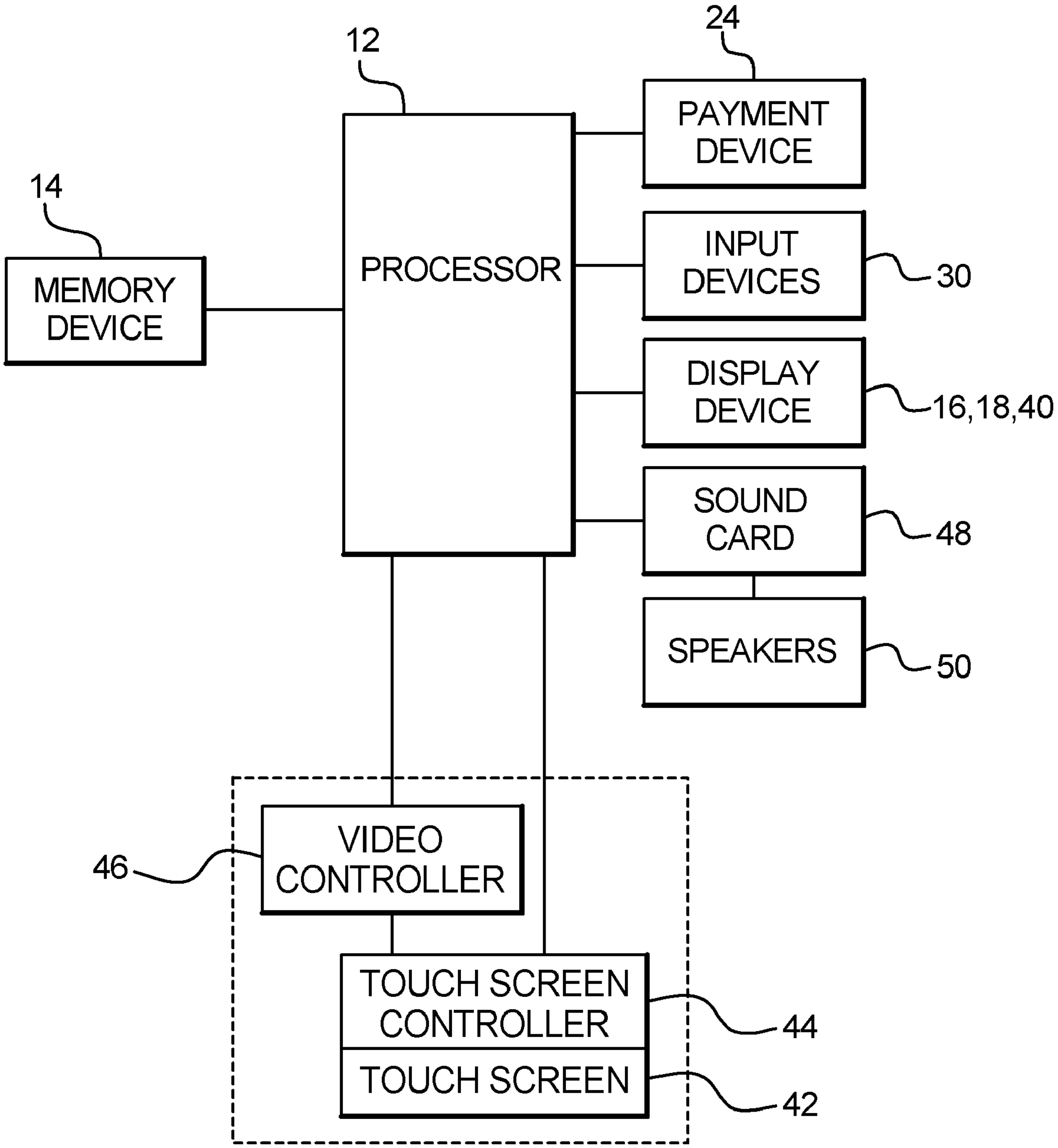
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASICs). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices 16, 18, and 40 controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In further embodiments, displays 16 and 18 may also include a targets accumulated display area 304 and a collectors accumulated display area 306 indicating the number of accumulated targets and collectors for a given gaming device.

In one embodiment, the gaming device includes a player tracking display 40 which displays information regarding a player's play tracking status. In further embodiments, the gaming system includes a single, large display prominently placed (not illustrated) to enable individuals in a gaming area to visually determine the number of collectors and targets accumulated by each gaming device in the gaming system.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices may include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia. Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

Figure 2B:
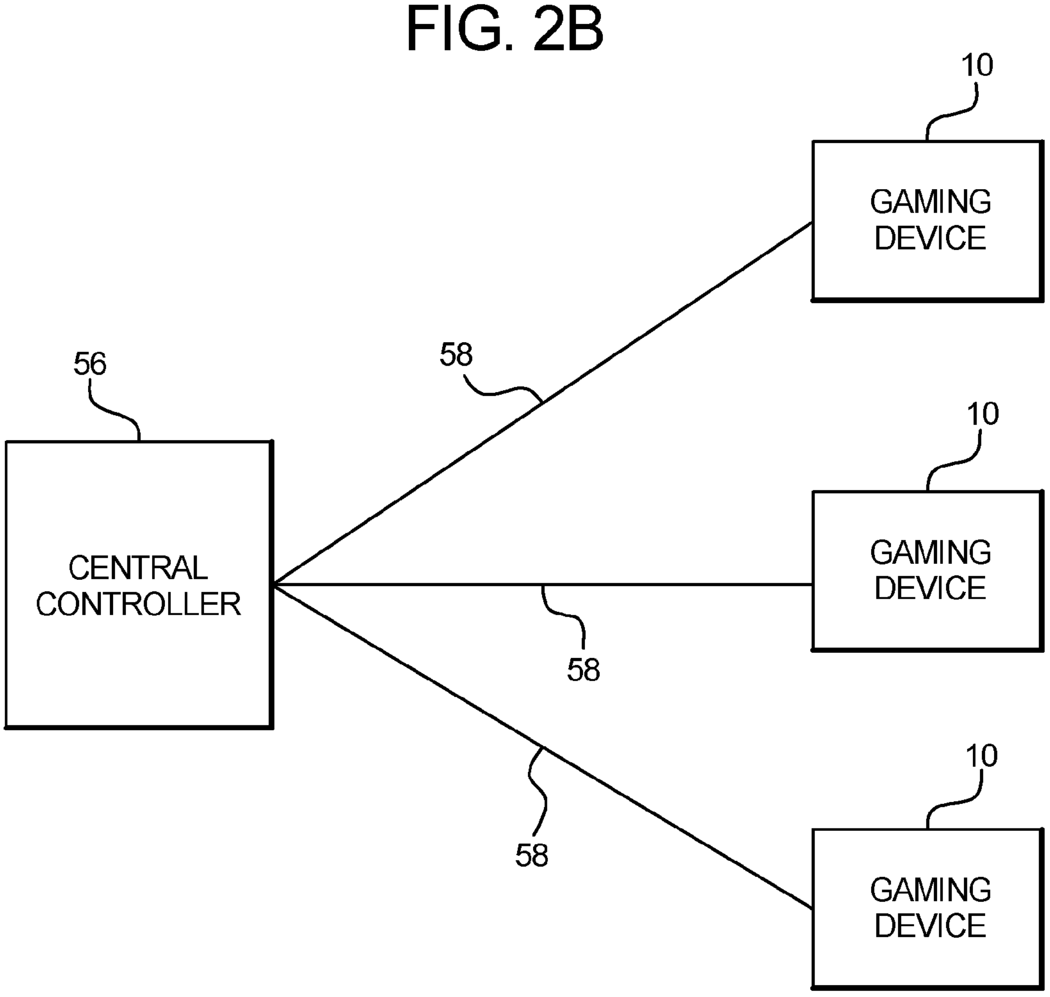
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Multiple Player Redemption Game

The gaming system disclosed herein includes a plurality of gaming devices and at least one central controller. The gaming devices cause a plurality of target-generation events, a plurality of collector-generation events, and a plurality of redemption events. For each target-generation event that occurs for a gaming device, the gaming device accumulates at least one target. For each collector-generation event that occurs for a gaming device, the gaming device accumulates at least one collector. In one embodiment, upon the generation of a redemption event, the central controller causes a community display to display a bonus sequence in which players redeem any accumulated targets and collectors for a bonus award. In one embodiment, the controller provides a bonus award to each player participating in the bonus sequence if one of the player's targets couples with any collector. In one embodiment, the bonus award is based on a plurality of target values associated with each of a plurality of accumulated targets. It should be appreciated that in different embodiments, targets and collectors represent potential future bonus redemption opportunities realizable during a future bonus sequence.

Figure 3:
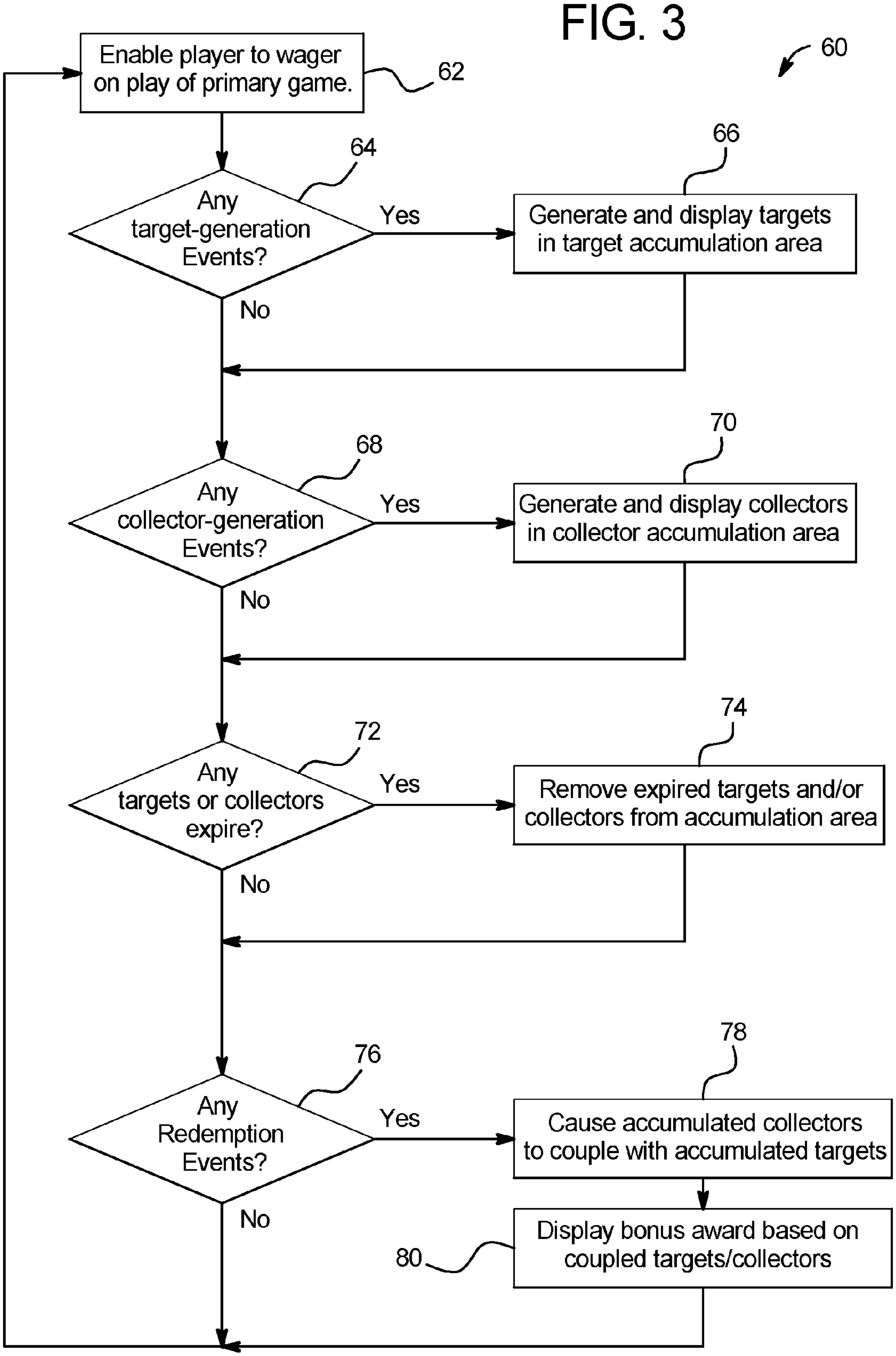
FIG. 3 is a flow chart of an example process for generating a plurality of collectors and targets and for redeeming the collectors and targets in a multiple player redemption event.

FIG. 3 illustrates a flow chart of an example process 60 of a play of the base game and the bonus sequence of the gaming system disclosed herein. Furthermore, the determinations made as part of the process 60 for playing a primary game and a bonus sequence as disclosed herein are discussed for brevity as determinations made by the gaming system. It should be appreciated that in various embodiments, a controller of the gaming system or one or more of the gaming devices of the gaming system makes one or more of the determinations of the process 60 of FIG. 3.

Process 60 begins in one embodiment by enabling a player to wager on a play of a primary game, as indicated by block 62. The gaming system in one embodiment begins a primary game by generating and displaying a plurality of symbols forming a plurality of symbol combinations in a plurality of symbol locations.

In one embodiment, the gaming system determines whether any target-generation events occurred for a play of the primary game, as indicated by block 64. If one or more target-generation events occurred, as indicated by block 66, the gaming system generates and displays a number or quantity of targets in a target accumulation area.

In one embodiment, target-generation events occur if a player wagers a predetermined number of credits on a play of the primary game. For example, a target-generation event occurs in one embodiment for each 10 credits a player wagers on a play of the primary game. Thus, if a player wagers 50 credits on a play of the primary game, a target-generation event occurs and results in the accumulation of five targets. In alternative embodiments, target-generation events occur based on one or more outcomes of primary game. For instance, if a gaming device generates a designated winning symbol or winning symbol combination for a play of a primary game, the gaming device in one embodiment generates one or more targets for a player. In another embodiment, target-generation events occur independent of any generated symbols in the primary game. It should be appreciated that in different embodiments, target-generation events are predetermined, randomly determined, determined based on the player's status (such as determined through a player tracking system), determined based on a random determination by the central controller, determined based on a random determination at the gaming device, determined based on players joining or placing a first wager on a play of a primary game, determined based on the occurrence of a collector-generation event, determined based on the number of players of the gaming system, determined based on the occurrence of a redemption event, determined based on one or more side wagers placed, determined based on time (such as the time of day), determined based on an amount of coin-in accumulated in one or more pools or determined based on any other suitable method or criteria. In further embodiments, targets are generated by or for each gaming device of a gaming system regardless of whether a player places a wager on a play of a primary game.

In various embodiments wherein targets represent potential future bonus redemption opportunities, the generation of targets, regardless of whether a player is placing wagers on plays of a primary game, increases player enjoyment and excitement to participate in a bonus sequence and to receive bonus awards.

The gaming system also determines whether any collector-generation events occurred, as indicated by block 68. If a collector-generation event occurs for a play of the primary game, the gaming system generates and displays one or more collectors in a collector accumulation area, as indicated by block 70.

In one embodiment, a collector-generation event occurs if a play of the primary game results in one or more winning symbols or winning symbol combinations. In an example embodiment, a collector-generation event occurs if a winning symbol combination is generated along an active payline. In this embodiment, the collector-generation event causes the gaming system to generate and display at least one collector. In a further embodiment, a collector-generation event also causes the gaming system to generate and display one or more targets and to provide a player with a primary game award of one or more credits. In various embodiments, the occurrence of collector-generation events is predetermined, determined based on the player's status (such as determined through a player tracking system), determined based on a generated symbol or symbol combination, determined based on a random determination by the central controller, determined based on a random determination at the gaming device, determined based on a wager on a play of the primary game, determined based on players joining or placing a first wager on a play of a primary game, determined based on the occurrence of a target-generation event, determined based on the number of players of the gaming system, determined based on the occurrence of a redemption event, determined based on a random determination at the gaming machine, determined based on one or more side wagers placed, determined based on time (such as the time of day), determined based on an amount of coin-in accumulated in one or more pools, or determined based on any other suitable method or criteria.

The gaming system also determines whether any targets or collectors have expired, as indicated by block 72. In one embodiment, the gaming system determines whether targets or collectors have expired as indicated by block 72 at predetermined times or intervals or on a regular basis. In one embodiment, the determination is made after each play of the primary game. If one or more targets or collectors have expired, the gaming system removes the expired targets and/or collectors from the accumulation area(s) of the community display, as indicated by block 74.

In one embodiment, each target and each collector has a finite life span. In one embodiment, the life span of a target or a collector is measured by the passage of time. In this embodiment, after a predetermined amount of time has passed, the target or collector expires and no longer represents a potential future bonus redemption opportunity. In another embodiment, targets and collectors expire after a predetermined number of plays of the primary game. In still another embodiment, targets and/or collectors exist until the end of the next bonus sequence—that is, targets and/or collectors exist through a single bonus sequence. In one embodiment, at least one target or one collector exists until it is coupled with an appropriate target or collector during a bonus event. In one embodiment, targets or collectors generated for certain players exist for different durations depending on a characteristic of the player such as a player status or rank, wager frequency, wager amount, or other suitable characteristic. In one embodiment, each target and each collector has a finite lifespan. In one embodiment, one or more of the plurality of targets and/or collectors expires after a predetermined number of plays of the game. In another such embodiment, one or more of the plurality of targets and/or collectors expires after the triggering of a bonus sequence or other designated trigger or event. In another embodiment, one or more of the plurality of targets and/or collectors expire upon an occurrence of the first of (1) a predetermined number of plays of the primary game and (2) a communal bonus sequence.

In different embodiments, the time it takes for a target or a collector to expire is determined by the average amount of a player's wager on the primary game, determined based on whether a target or collector was involved in a coupling, determined by the rate of wagers placed on a primary game, determined by any winning symbol combination from the primary game, predetermined, randomly determined, determined based on the player's status (such as determined through a player tracking system), determined based on one or more side wagers placed, determined based on determined based on time (such as the time of day), determined based on an amount of coin-in accumulated in one or more pools, or determined based on any other suitable method or criteria.

In various embodiments, at least one display of the gaming system is configured to reflect any expired targets or collectors. In one embodiment, the gaming system reflects these expirations by causing the symbols indicating the expired target(s) or collector(s) to be removed from a display. In a further embodiment, the gaming system displays an animated sequence of the target(s) or collector(s) expiring consistent with the theme of the gaming system. In one embodiment, after each play of the primary game, a summary of the targets and collectors accumulated or lost during that play of the primary game is displayed on the appropriate gaming device.

It should be appreciated that in one embodiment the determination of whether targets and/or collectors expire is made after the generation of the plurality of symbols in the primary game. In another embodiment, the gaming system determines whether targets and/or collectors expire without regard to whether a player has wagered on a play of the primary game or whether symbols have been generated. In this embodiment, targets and/or collectors may expire between plays of the primary game, whether or not the player is wagering on plays of the primary game.

For each play of the primary game, the gaming system also determines whether a redemption event occurs as indicated by block 76.

In one embodiment, a play of the primary game results in a redemption event. In one embodiment, a redemption event occurs based on a winning symbol or winning symbol combination appearing in the primary game of one of the gaming devices. In one embodiment, a redemption event occurs if a player makes a wager of a predetermined magnitude. In different embodiments, the occurrence of a redemption event is predetermined, determined based on the player's status (such as determined through a player tracking system), determined based on a random determination by the central controller, determined based on a random determination at the gaming machine, determined based on one or more side wagers placed, determined based on time (such as the time of day), determined based on an amount of coin-in accumulated in one or more pools, or determined based on any other suitable method or criteria.

In one embodiment, a redemption event cannot occur until a predetermined number of collectors have been generated and accumulated by the plurality of players. In alternative embodiments, based on an outcome of a primary game, the gaming system enables a player whose wager on a play of the primary game resulted in a redemption event to choose when and whether to trigger a bonus sequence.

In various embodiments, the occurrence of a redemption event results in the generation and display of one or more additional collectors or one or more additional targets. In one such embodiment, the player of the gaming device at which the redemption event occurred is awarded with additional targets and/or collectors. In another such embodiment, at least one additional player is awarded additional targets and/or collectors upon the occurrence of a redemption event.

If one or more redemption events occur, the gaming system in one embodiment displays a bonus sequence wherein the accumulated collectors couple with the accumulated targets, as indicated by block 78. In various embodiments, the bonus sequence enables players at gaming devices of the gaming system to redeem targets and/or collectors for additional awards. In one embodiment, the gaming system displays a bonus sequence by enabling the generated collectors to couple with the generated targets. In one embodiment, the gaming system displays this bonus sequence as the removal of a barrier displayed on the community display that separates the plurality of accumulated collectors from the plurality of accumulated targets. In this embodiment, once the barrier has been removed, the gaming system displays the collectors as coupling with the targets. In one embodiment, each collector couples with a single target until all the collectors have coupled with a target, or until all the targets have coupled with a collector.

In one embodiment, the gaming system is configured to display the collectors as moving prior to coupling with a target. In this embodiment, the gaming system is configured to display the collectors as moving to increase player excitement and enjoyment during the bonus sequence. In one embodiment, the gaming system displays the collectors as moving randomly amongst the targets displayed. In one embodiment, a plurality of collectors are displayed to couple with a plurality of targets, resulting in coupled pairs of targets and collectors. In one embodiment, a plurality of targets are displayed to couple with a plurality of collectors. When a collector couples with a target, the coupled collector is displayed as stationary and associated with the coupled target. In one embodiment, a coupled target is not eligible to couple with a non-coupled collector. Similarly, in one embodiment, a coupled collector is not eligible to couple with a non-coupled target.

In one embodiment, the gaming system makes a plurality of random determinations about whether and with which target a collector couples. In one embodiment, the determination of whether to couple a collector with a target is made based on a probability associated with either a target or a collector. In one embodiment, the determination occurs at the time the redemption event occurs, but the gaming system displays the bonus sequence as if each collector moves amongst the plurality of targets for a random amount of time. In different embodiments, the determination of when and whether a collector couples with a target is predetermined, determined based on the player's status (such as determined through a player tracking system), determined based on a random determination by the central controller, determined based on a random determination at the gaming device, determined based on one or more side wagers placed, determined based on time (such as the time of day), determined based on an amount of coin-in accumulated in one or more pools or determined based on any other suitable method or criteria.

In another embodiment, the gaming system increases player excitement and enjoyment by displaying moving collectors as attempting to couple with a target. In one embodiment, a bonus sequence continues until each collector has coupled with exactly one target. It should be appreciated that in various embodiments, the gaming system determines the target with which a collector couples (if any) randomly, wherein the random determination makes it more likely that the collector will couple with targets with low target values. In one embodiment, target values are correlated with a target's distance from the accumulation area of the player for whom the target was generated, with targets at greater distances having larger target values. In this embodiment, it is therefore less likely that a collector will couple with a target that is located a great distance from the collector accumulation from which the collector was released.

In one embodiment, each collector is assigned a randomly generated time upon the initiation of a bonus sequence. The gaming system is then configured to display the collectors as randomly moving amongst the targets until the random time expires. Upon expiration, the collector is configured to couple with the target from which the displayed distance is smallest.

In one embodiment, prior to the bonus sequence, the gaming system randomly associates each accumulated collector participating in the bonus sequence with a target by randomly assigning collectors to lower-valued targets before randomly assigning collectors to higher-valued targets. In another embodiment, the controller alternates assignment of targets of each value between the collectors of each participating gaming device. For example, if two gaming devices are participating in the bonus sequence, the controller assigns a collector associated with one of the gaming devices to a target of one value. The controller next assigns a collector associated with the other gaming device to an target of the same value. The controller continues alternating assignment of targets of each value between the collectors associated with the participating gaming devices until collectors associated with one gaming device remain unassigned. The remaining unassigned collectors are each randomly assigned to an available target.

In one embodiment, the gaming system assigns a certain percentage of collectors of each participating gaming device to targets of each value. The percentage of collectors assigned to targets of each value is thus based on the total number of collectors participating in the bonus sequence. In a further embodiment, the gaming system assigns a higher percentage of collectors of each participating gaming device to higher-valued targets if the total number of collectors generated for that gaming device is higher. It should be appreciated that other suitable methods for assigning targets to collectors can be utilized within the scope of the instant disclosure.

In another embodiment, the gaming system determines and associates a random value with each collector indicating the number of targets it will examine prior to coupling. In one embodiment, each collector includes a predefined collector counter. In this embodiment, the gaming system selects a random direction for each target such that the targets move randomly. For example, the gaming system may select a random direction and a random number of pixels. In one embodiment, when a collector is within a predefined number of pixels (i.e., within 10 pixels), the gaming system decrements the collector counter. When the collector counter reaches a predefined value (i.e., a value of zero) and the collector is within a predefined distance (i.e., 10 pixels) of a target, the gaming system displays the target and the collector as coupling. It should be appreciated that in various embodiments, the disclosed gaming system determines relative positions of targets and collectors based on different measurement parameters than a quantity of pixels, such as by algebraically calculating a distance between two points. It should be appreciated that by having each collector displayed in close proximity with more than one target prior to coupling, the gaming system disclosed herein increases player excitement. Moreover, it should be appreciated that by displaying the collectors as moving randomly amongst the targets, a higher initial collector counter results in a greater probability that a collector will couple with a target with a relatively high target value.

In one embodiment, the gaming system is configured to couple a moving collector with the first target it encounters. In this embodiment, the gaming system is configured to display one or more collectors as coupling with the first redeemable target it encounters during a bonus sequence. In various such embodiments, the gaming system is configured to couple all or most of a plurality of relatively lower-valued targets prior to coupling any relatively higher-valued targets.

Referring again to FIG. 3, the gaming system in one embodiment displays one or more bonus awards associated with one or more players based on any coupled collectors and coupled targets, as indicated by block 80.

In one embodiment, each player's bonus award is calculated based on the target values of the targets generated by that player's gaming device that couple with any collector. In one embodiment, bonus awards for each participating player are a portion of a predetermined bonus award. In this embodiment, each the gaming device provides a portion of the predetermined bonus award to each participating player based on any coupled targets or collectors associated with the player. For example, for a coupled target/collector pair, the player with whom the coupled collector is associated may receive 25% of a predetermined bonus award, and the player with whom the coupled target is associated may receive 75% of a predetermined bonus award.

If no redemption event occurs, or upon completion of bonus sequence, the gaming system enables a player to place another wager on a play of the primary game, as indicated by block 62.

It should be appreciated that in various embodiments, the determinations indicated by the above-referenced blocks are performed in a different order than illustrated in FIG. 3. In various embodiments, one or more of the determinations, such as the determination of whether any target-generation events occur, is made prior to the determination of whether any winning symbols or winning symbol combinations are present. Further, the determination of whether any target-generation events occurred may be made prior to the generation and display of a plurality of symbols as indicated by block 62.

In various embodiments, one or more of the determinations indicated by blocks 64, 68, 72, or 76 are made whether or not a player has wagered on a play of the primary game. In an example embodiment, target-generation events occur even if players are not wagering on plays of a primary game. In this embodiment, the disclosed gaming system determines whether any target-generation events occur, as indicated by block 64, regardless of whether a wager has been placed.

Figure 4A:
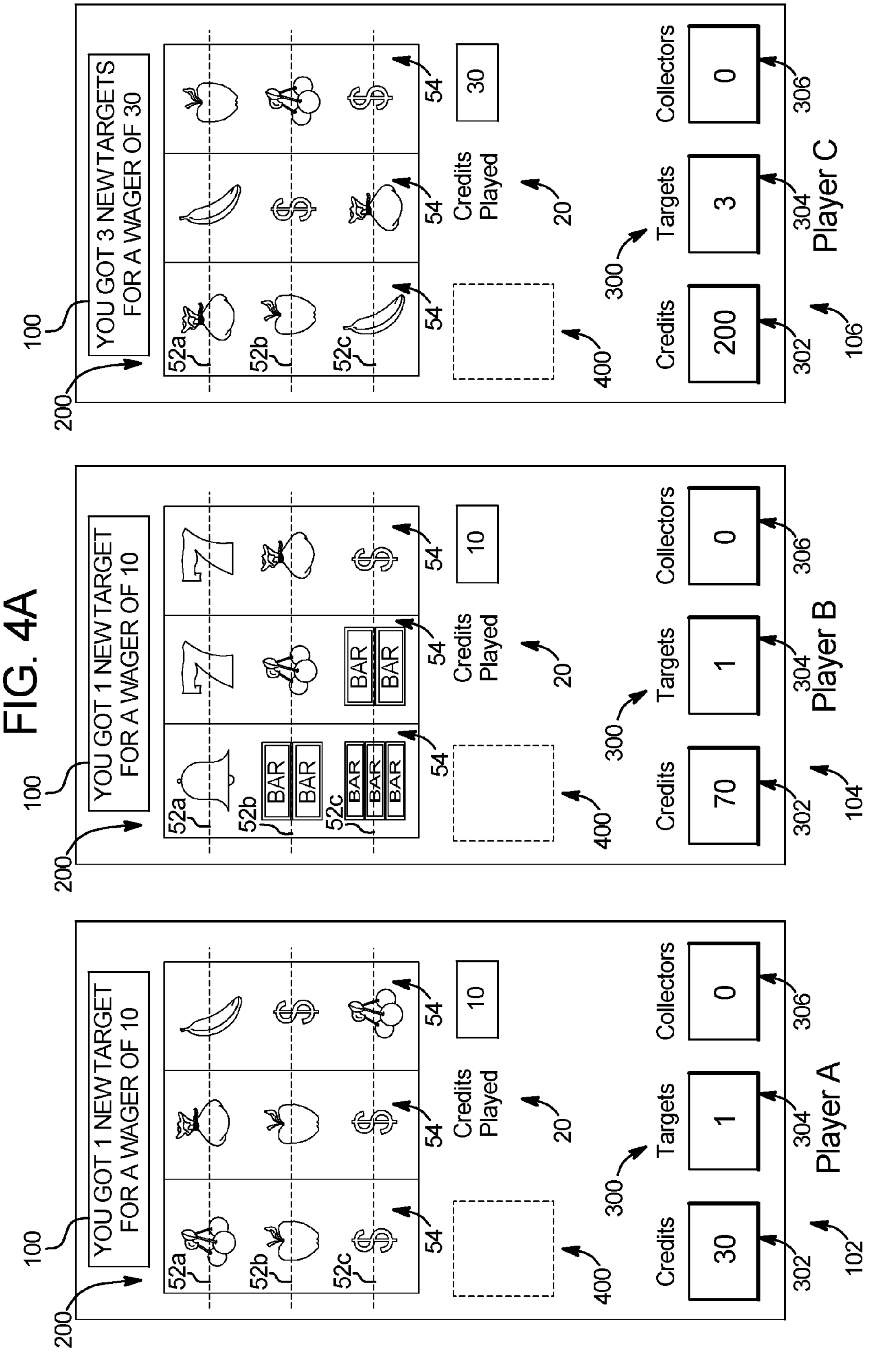
FIGS. 4A, 4B, 4C, and 4D are front elevation views of a plurality of gaming devices in one embodiment of the gaming system of the present disclosure during a plurality of plays of the primary game disclosed herein.
Figure 5A:
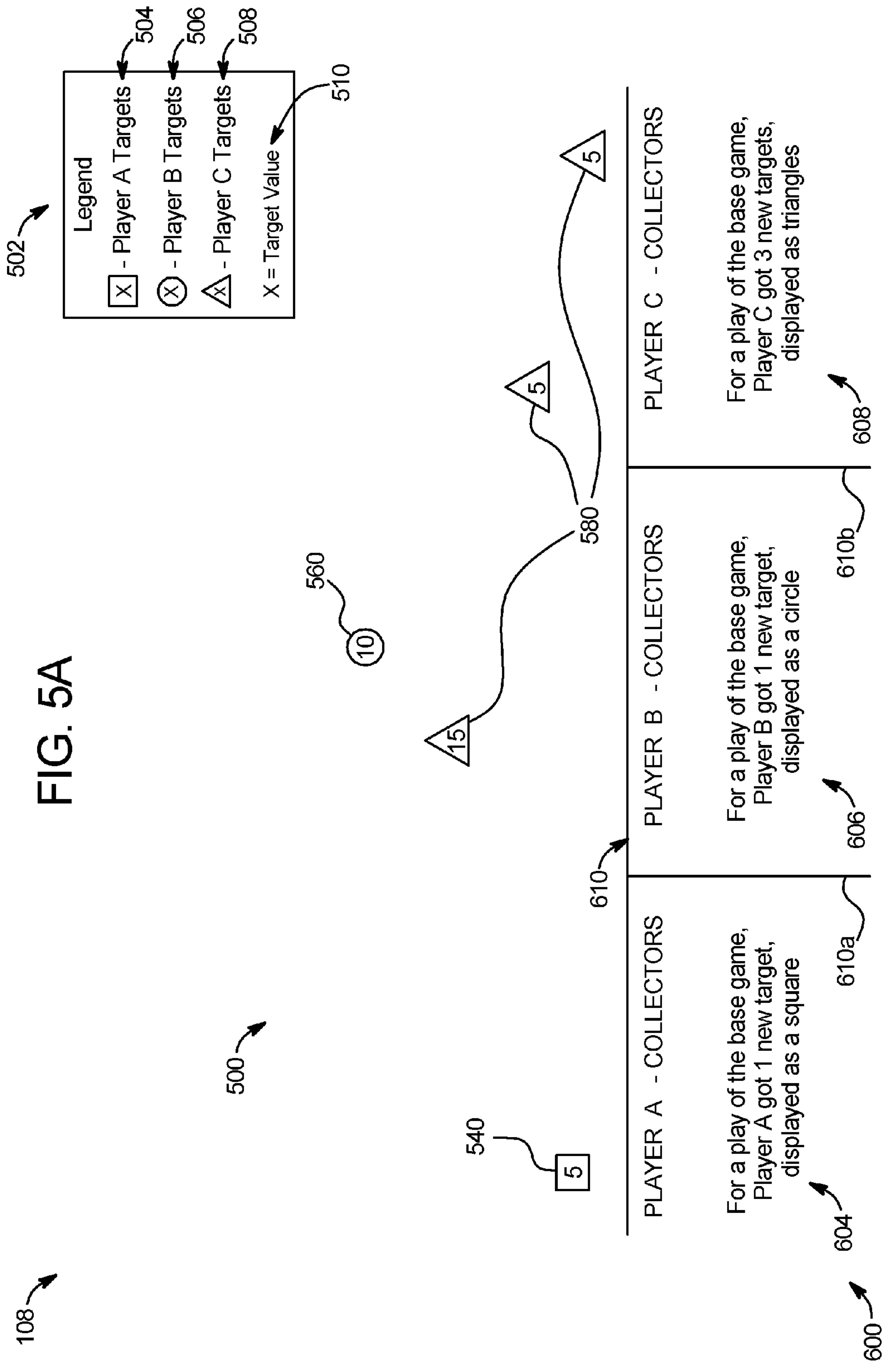
FIGS. 5A, 5B, 5C, and 5D are front elevation views of the community display for displaying targets and collectors accumulated during a plurality of plays of the primary game disclosed herein for each gaming device in one embodiment of the gaming system of the present disclosure.

Referring now to FIGS. 4A and 5A, in one embodiment, the gaming system disclosed herein includes a plurality of gaming devices 102, 104, and 106 and a community display 108. In this embodiment, a plurality of credits, targets, and collectors are generated for various events occurring at gaming devices 102, 104, and 106 during plays of a primary game. In various embodiments, each gaming device 102, 104, and

106 displays an indication of any accumulated targets and collectors and the total credits available to a player at the gaming device. In one embodiment, illustrated in FIG. 5A, the community display 108 includes a real-time representation of any targets and collectors accumulated by each of the gaming devices of the gaming system. Thus, in one embodiment, the target and collector information displayed on the community display 108 of FIG. 5A is cumulative of the target and collector information generated and displayed by each of the gaming devices 102, 104, and 106 of the gaming system as illustrated in FIG. 4A.

In the embodiment illustrated by FIG. 4A, the gaming devices 102, 104, and 106 of the gaming system each enable a player to place wagers on plays of a primary game. Moreover, the gaming devices of the gaming system enable a player to accumulate targets and collectors and to receive awards for plays of the primary game. Finally, one or more redemption events occur, which result in the initiation of a bonus sequence. In various embodiments, the primary game is different for one or more of the gaming devices 102, 104, and 106. For brevity, the primary game of each gaming device 102, 104, and 106 is illustrated and referred to below as a slot game including three reels and three horizontal paylines.

In one embodiment, illustrated by FIG. 4A, each gaming device 102, 104, and 106 includes a target/collector status message display area 100, a primary game display area 200, a credits played display area 22, a real-time display area 300, and a primary game summary display area 400. In the illustrated embodiment, each of these display areas is displayed on a single display device 16 of each gaming device. In this embodiment, the target/collector status message display area 100 displays messages to a player indicating a summary of the accumulated and/or expired targets and collectors for a single play of the primary game. The primary game display area 200 displays the base or primary game. The real-time display area 300 displays real-time information about the number of credits, targets, and collectors accumulated by a player at a gaming device 102, 104, or 106. The primary game summary display area 400 displays information summarizing the results of a single play of the primary game.

In one embodiment, illustrated in FIG. 4A, the target/collector status message display area 100 displays information about the number of targets and/or collectors generated and the number of targets and/or collectors expired for each play of the primary game. Each target and each collector exists for a finite amount of time, so the target/collector status message display area 100 displays real-time information indicating to the player whether any targets or collectors have been generated or have expired. It should be appreciated that any generated or expired targets or collectors indicated in the target/collector status message display area 100 are simultaneously reflected in the data contained in the real-time display area 300, and in the information displayed on the community display 108. It should be appreciated that awards, target-generation events, collector-generation events, and redemption events occur in one embodiment based on the outcome of the primary game displayed in primary game display area 200.

As illustrated by FIG. 4A, the real-time display area 300 includes a number of accumulated targets display area 304 and a number of accumulated collectors display area 306 by or for a gaming device 102, 104, or 106. It should be appreciated that in one embodiment, the information displayed in real-time display area 300 persists from more than one play of the primary game. In this embodiment, the information displayed in the real-time display area represents data about a plurality of plays of the primary or base game, and represents data cumulative through the plurality of plays of the primary or base game since the later of (a) the player of the gaming device placed a first wager on a play of the primary game and (b) the player of the gaming device participated in a bonus sequence. It should thus be appreciated that in the various embodiments, a player's decision to stop placing wagers on plays of a primary game or a player's participation in a bonus sequence causes the displayed numbers in accumulated targets display area 304 and in accumulated collectors display area 306 to be reset to zero.

In one embodiment, the primary game summary display area 400 displays information about the results of a single play of the primary game, including identification of any winning symbol or winning symbol combination, the number of any credits won, and the number of any collectors generated. In one embodiment, when the an appropriate redemption event occurs, the primary game summary display area 400 also displays a message indicating that a player has activated a bonus round. It should be appreciated that the information displayed in the primary game summary display area 400 is reflected in real time in the numbers displayed in the real-time display area 300.

Referring again to FIG. 5A, the gaming system in one embodiment includes a community display 108 for displaying the collectors and targets accumulated for each gaming device of the gaming system. In various embodiments, the community display 108 is large and prominently placed such that it enables players at each of the gaming devices to simultaneously view the information displayed. In further embodiments, the community display 108 is positioned in a casino or gaming area to enable non-players in the casino or gaming area to view the information displayed on the display. In other embodiments, the community display 108 is displayed identically on each gaming device, such as on a secondary display device 18. In still other embodiments, the community display 108 is large and prominently displayed, and the information of the display is replicated on a secondary display device 18 of each gaming device of the gaming system. It should be appreciated that in various embodiments, community display 108 is configured to enable players not wagering on plays of a primary game of the gaming system to see that a predefined number of targets or collectors have been accumulated by the gaming system. For instance, if a community display 108 displays a relatively large number of collectors, the gaming system is in a state to enhance player excitement and enjoyment based on the relatively high number of potential bonus redemption opportunities present. In one embodiment, the community display 108 includes a plurality of display devices positioned in proximity of one another. In this embodiment, the gaming system is configured to cause each of the plurality of display devices to display a portion of the bonus sequence such that together, the plurality of display devices display a communal game display area.

As illustrated, display 108 includes a target accumulation area 500 and a collector accumulation area 600. In one embodiment, the target accumulation area 500 and the collector accumulation area 600 are displayed as positioned substantially adjacent to one another, as illustrated in FIG. 5A. In these embodiments, releasing collectors from the collector accumulation area 600, such as to begin a bonus sequence, enables the collectors to move amongst the targets of target accumulation area 500.

In alternative embodiments, the target accumulation area 500 and the collector accumulation area 600 are displayed separately from one another. In these embodiments, the target accumulation area 500 and the collector accumulation area 600 are displayed to indicate that they are operatively linked—that is, they are displayed such that collectors in the collector accumulation area 600 have displayed physical access to the targets in the target accumulation area 500. It should be appreciated that the objects which represent targets and collectors in different embodiments enable the areas to be displayed separately (e.g., the collectors are miners, the targets are gold nuggets in a mine, and the target accumulation and collector accumulation areas are displayed as separated but connected by a mine shaft).

The target accumulation area 500 in the embodiment illustrated in FIG. 5A includes a single, continuous area in which the targets generated by gaming devices 102, 104, and 106 are displayed. In one embodiment, the target accumulation area includes a legend 502 to indicate which targets belong to Player A, Player B, or Player C (i.e., which targets were generated by gaming device 102, gaming device 104, and gaming device 106). In the illustrated embodiment, the targets belonging to Player A are represented as squares 504, the targets belonging to Player B are represented as circles 506, and the targets belonging to Player C are represented as triangles 508. The legend 502 also indicates that each target includes a Target Value 510 indicated by a numeral displayed within the target.

In various embodiments, the targets displayed in the target accumulation area 500 include a target value, as noted above. In one embodiment, the target value for each displayed target is assigned based on the distance of the target from the collector display area associated with the gaming device that detected the target-generation event. In this embodiment, the farther a target is from the starting point of the collectors, the less likely it is that a collector will couple with the target of the higher target value. In alternative embodiments, the value associated with a target is predetermined, randomly determined, determined based on the number of target-generation events detected by a gaming device, determined based on a target's distance from another displayed object of the target accumulation area 500, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

The collector accumulation area 600 includes separate collector accumulation areas corresponding to each player at or of a gaming device of the gaming system. In the illustrated embodiment, the collector accumulation area 600 includes a Player A collector accumulation area 604, a Player B collector accumulation area 606, and a Player C collector accumulation area 608. The collector accumulation area 600 also includes one or more barriers 610 to separate any collectors in one of the player-specific collector accumulation areas from the collectors in the other player-specific collector accumulation areas and from the target accumulation area 500.

It should be appreciated that in various embodiments, the plurality of targets and collectors are displayed to indicate the player for whom the targets or collectors were generated. For instance, in the embodiment illustrated by FIG. 5A, the targets and collectors are represented as geometric shapes, wherein the targets are represented by small versions of various shapes and the collectors are represented by large versions of the same shapes. In such embodiments, the targets and collectors having the same geometric shape belong to the same player and/or were generated at or by the same gaming device. In different embodiments, the targets and collectors for a plurality of players have identical shapes or forms but are displayed in different colors corresponding to the players of the gaming devices of the gaming system. In such an embodiment, any yellow shapes represent targets or collectors generated for the same player and/or the same gaming device. In still other embodiments, the player for whom the targets and/or collectors are generated is indicated by size, location, sound, appearance, or some other suitable identifying characteristic.

In various embodiments, the targets and/or collectors of one or more of the players of the gaming system disclosed herein are displayed as customized to the individual player for whom the targets and/or collectors are generated. For example, the disclosed gaming system may display a plurality of gaming elements (i.e., targets and/or collectors) for a first player differently from the display of a plurality of gaming elements for second player, depending on each player's preferences as stored in a player tracking system. In one embodiment, the displayed form of one or more targets and/or collectors may impact whether a particular target can couple with a particular collector. For example, depending on the displayed form of a target of the first player, a collector of the second player may not couple with the target of the first player.

In one embodiment, the collectors are displayed as identical for each player. In this embodiment, the targets for the plurality of players at the gaming devices of the gaming system disclosed are distinguishable as described above, and the collectors are separated by barrier 610 including barriers 610*a* and 610*b*. In another embodiment, each of the collectors is identical and the gaming system does not distinguish among collectors belonging to individual players. In this embodiment, the collector accumulation area does not include barriers 610*a* and 610*b* to separate the players' collectors.

Various embodiments of the gaming system disclosed herein contemplate employing one or more community displays in conjunction with the gaming devices which will provide the players of the gaming devices information about the bonus awards to increase player awareness of these awards and interaction between players of the gaming machines. The display(s) can provide any suitable information about the gaming system, gaming devices, bonus sequences and bonus sequence awards. The presence of multiple prominent displays in one embodiment increases the excitement and enjoyment of players wagering on plays of the primary game and of people in the casino or gaming area.

In various embodiments, the symbols or indicia indicating the plurality of targets and the plurality of collectors vary based on the player with whom the target or collector is associated, the target value associated with the target, a collector value associated with the collector, the position of the gaming device with which the target or collector are associated, or based on the magnitude of the value associated with a target or a collector.

Referring again to FIG. 4A, Player A makes wagers on plays of the primary game of gaming device 102, Player B makes wagers on plays of the primary game of gaming device 104, and Player C makes wagers on plays of the primary game of gaming device 106. It should be appreciated that in various embodiments, (such as in the illustrated embodiment), the three players at or of the three gaming devices in the gaming system make wagers on plays of the primary game substantially simultaneously. In different embodiments, the three players at or of the three gaming devices in the gaming system make wagers on plays of the primary game occurring with differing frequencies. For instance, in one embodiment Player A makes wagers on two plays of the primary game at gaming device 102 in the same amount of time it takes player B to make wagers on a single play of the primary game at gaming device 104.

As discussed below, FIGS. 4A to 4D and FIGS. 5A to 5D illustrate an embodiment of the gaming system disclosed herein including four wagers on plays of the primary game by each of Players A, B, and C, wherein each of Players A, B, and C make wagers on the plays of the primary game simultaneously.

FIGS. 4A and 5A illustrate an example embodiment of the gaming devices 102, 104, and 106 and the community display 108 after a first play of the primary game of each gaming device. In the illustrated example embodiment, prior to the first play of the primary game of each gaming device, the credits remaining display area 20 of gaming device 102 indicated that Player A had 40 credits, the credits remaining display area 20 of gaming device 104 indicated that Player B had 80 credits, and the credits remaining display area 20 of gaming device 106 indicated that Player C had 230 credits (not shown). Moreover, since the illustrated embodiment represents the results of a first play of the primary game for each gaming device, none of the gaming devices had accumulated any targets or collectors prior to the illustrated first play of the primary game.

In the illustrated embodiment, target-generation events occur when a player of a gaming device wagers at least a predetermined amount of credits on a play of the primary game. As illustrated in FIGS. 4A and 5A, the first play of the primary game of gaming devices 102, 104, and 106 each result in a target-generation event. In the illustrated embodiment, the credits played display area 22 of gaming device 102 indicates that Player A wagered 10 credits on the illustrated play of the primary game, the credits played display area 22 of gaming device 104 indicates that Player B wagered 10 credits on the illustrated play of the primary game, and the credits played display area 22 of gaming device 106 indicates that Player C wagered 30 credits on the illustrated play of the primary game. In the illustrated embodiment, wagering 10 credits on a play of a primary game is a target-generation event, wherein the number of targets generated is the number of credits wagered divided by 10, truncated to an integer value.

In one embodiment, the target/collector status display area 100 of each gaming device 102, 104, and 106 indicates that a target-generation event occurred for each gaming device. More specifically, the target/collector status display area 100 of gaming device 102 indicates that Players A accumulates one target, the target/collector status display area 100 of gaming device 104 indicates that Player B accumulates one target, and the target/collector status display area 100 of gaming device 106 indicates that Player C accumulates three targets.

In one embodiment, the gaming system updates the information displayed by the gaming devices and by the community display to represent the newly generated targets. As illustrated in FIG. 4A, the number of targets accumulated display area 304 of each gaming device is updated to reflect the newly-accumulated targets after the illustrated play of the primary game. In this embodiment, the number of targets accumulated display area 304 of gaming device 102 indicates one accumulated target, the number of targets accumulated display area 304 of gaming device 104 indicates one accumulated target, and the number of targets accumulated display area 304 of gaming device 106 indicates three accumulated targets.

As illustrated in FIG. 5A, the gaming system displays the number of targets generated by each gaming device in target display area 500 of display device 108, such that one target 540 is displayed for Player A, one target 560 is displayed for Player B, and three targets 580 are displayed for player C. Moreover, the gaming system assigns a target value to each target, indicated by a numeral inside the target. In one embodiment, the target value is determined based on a target's distance from the corresponding player's collector accumulation area 604, 606, or 608.

In one embodiment, the gaming system provides players with an award if a winning symbol combination is generated on a payline of a primary game. In this embodiment, the award includes a plurality of credits. In different embodiments, the number of credits awarded is determined based on the statistical probability of generating a particular winning symbol combination. In the embodiment illustrated by FIGS. 4A and 5A, since no winning symbol combinations were generated for any of the paylines 52A, 52B, or 52C of any of the gaming devices 102, 104, or 106, none of the Players A, B, or C receive an award. Thus, the numbers displayed in the credits accumulated areas 20 are not incremented.

In one embodiment, collector-generation events occur if a winning symbol combination is generated in the primary game of a gaming device. In the embodiment illustrated in FIG. 4A, none of the gaming devices 102, 104, or 106 generate a winning symbol combination on any of the pay lines 52A, 52B, or 52C for the first play of the primary game, so no collector-generation events occur for any of the illustrated gaming devices. As a result, the primary game summary display area 400 remains blank and the number of collectors accumulated display area 306 displays zero for each of the gaming devices 102, 104, or 106. Similarly, as illustrated in FIG. 5A, the gaming system does not display any generated collectors in the Player A collector accumulation area 604, the Player B collector accumulation area 606, or the Player C collector accumulation area 608 of display area 108.

Figure 9:
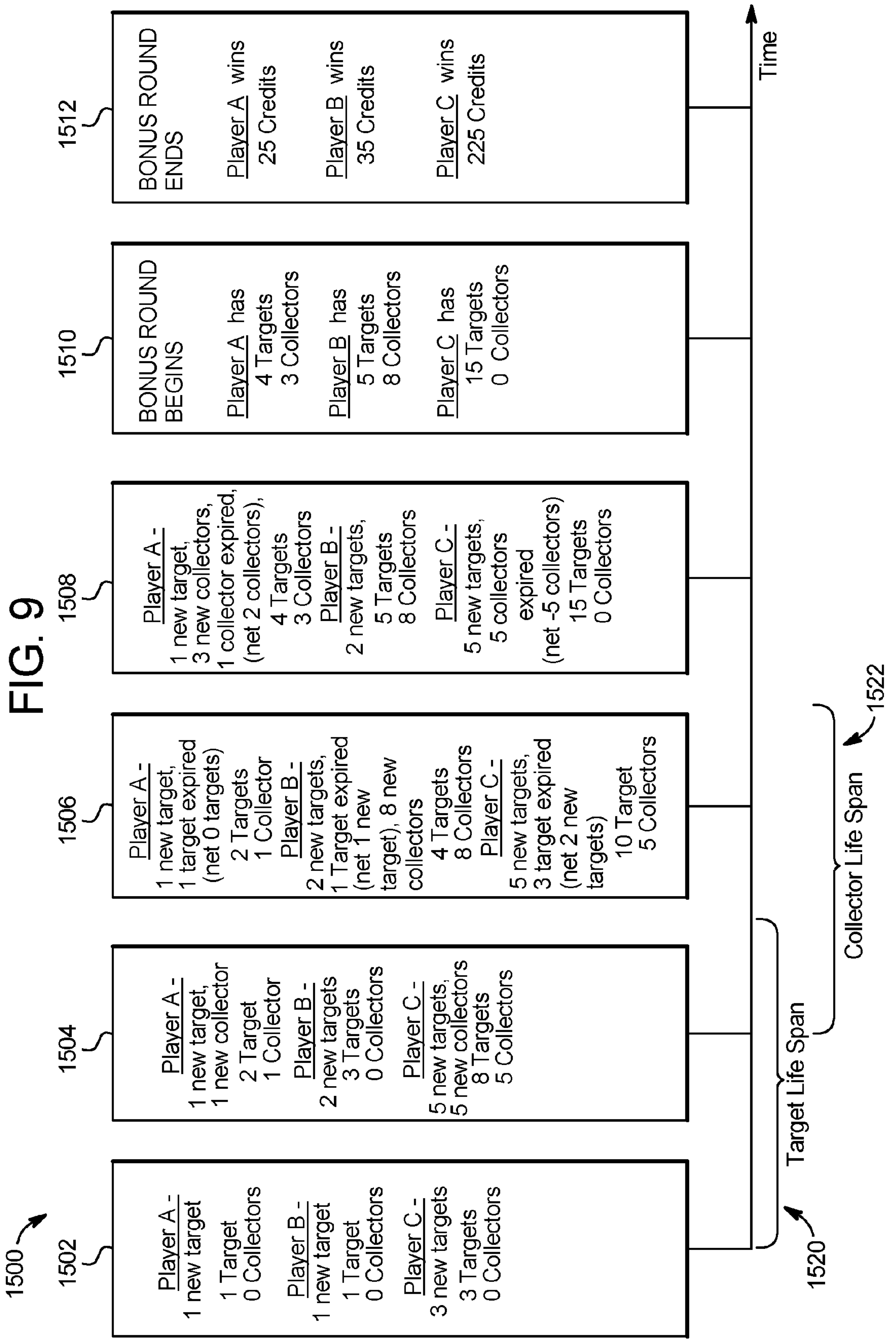
FIG. 9 is a timeline illustrating one embodiment of the accumulation, expiration, and coupling targets and collectors during a plurality of plays of the primary game and a single play of the bonus game disclosed.

FIG. 9 illustrates a timeline 1500 of a plurality of plays of the primary game of the gaming system disclosed herein, and a single displayed bonus sequence as disclosed herein. Block 1502 of timeline 1500 indicates a summary of the plays of the primary game illustrated by FIGS. 4A and 5A. As illustrated, for the first play of the primary game of each gaming device 1502, target-generation events occur such that Player A receives one target, Player B receives one target, and Player C receives three targets.

Figure 4B:
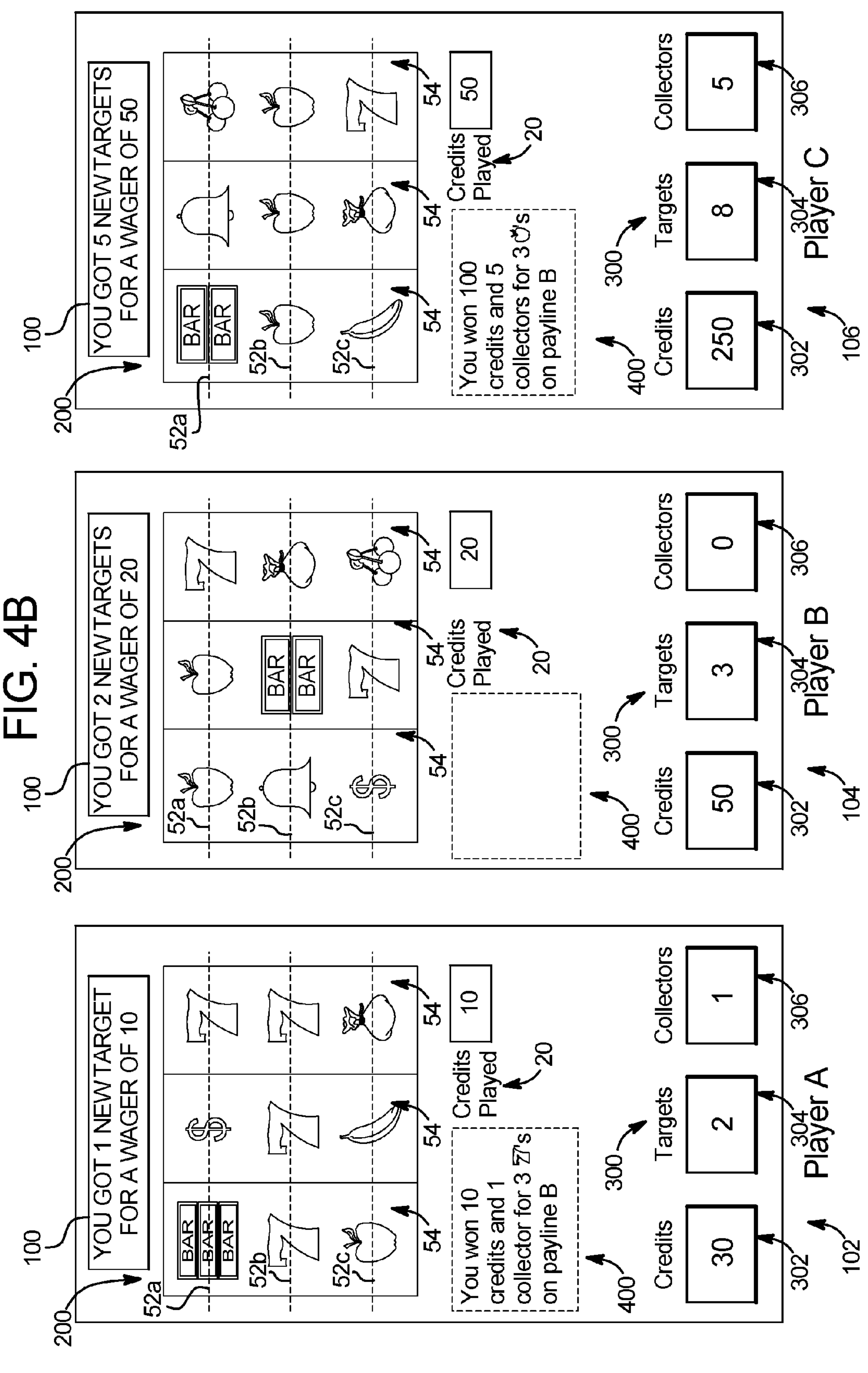
Figure 5B:
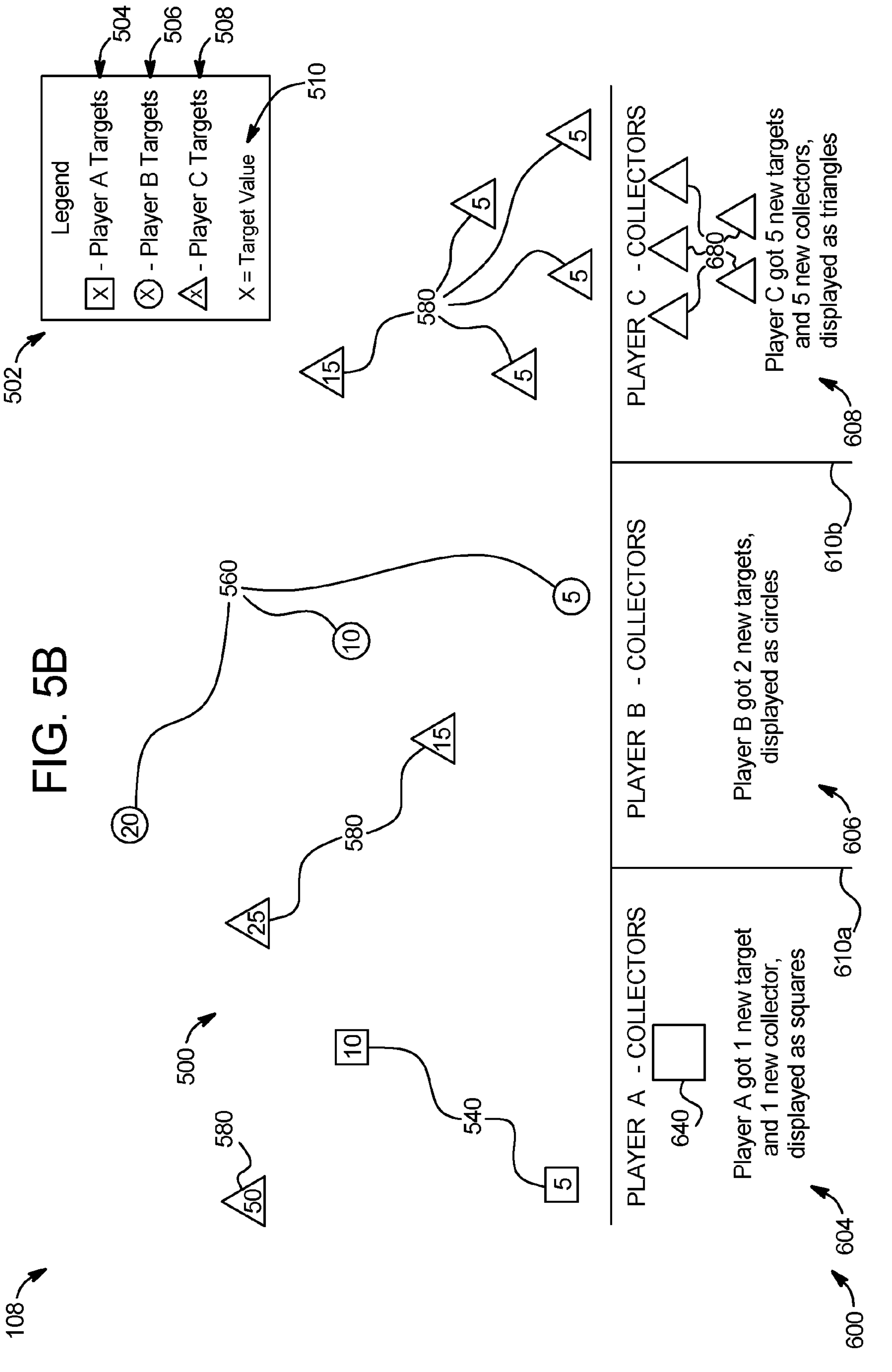

FIGS. 4B and 5B illustrate an example embodiment of the gaming devices 102, 104, and 106 and the community display 108 after a second play of the primary game of each gaming device. Prior to the play of the primary game illustrated by FIGS. 4B and 5B, the gaming devices and the community display appear as illustrated in FIGS. 4A and 5A, respectively.

As illustrated by the credits played display areas 22 of the gaming devices 102, 104, and 106 of FIG. 4B, Player A wagered 10 credits on the second play of the primary game, Player B wagered 20 credits on the second play of the primary game, and Player C wagered 50 credits on the second play of the primary game. Since each of these wagers exceeds 10 credits, each wager results in a target-generation event. The target/collector status message display area 100 of each gaming device therefore displays a message indicating that each player accumulates at least one new target. As indicated by the target/collector status message display areas 100 of gaming devices 102, 104, and 106 in FIG. 4B, Player A accumulates one target for wagering 10 credits, Player B accumulates two targets for wagering 20 credits, and Player C accumulates five targets for wagering 50 credits. As further illustrated by FIG. 4B, the number of targets displayed in the number of targets accumulated display area 304 of gaming device 102 is incremented by one for an accumulated targets value of two, the number of targets displayed in the number of targets accumulated display area 304 of gaming device 104 is incremented by two for an accumulated targets value of three, and the number of targets displayed in the number of targets accumulated display area 304 of gaming device 106 is incremented by five for an accumulated targets value of eight. FIG. 5B illustrates the targets accumulated after the second play of the primary game by displaying two targets 540, three targets 560, and eight targets 580 in target display area 500. In this illustrated embodiment, the gaming system displays the targets in random locations and assigns target values based on the distance of each target from the corresponding collector display area 604, 606, or 608.

In the embodiment illustrated by FIGS. 4B and 5B, the wagered-on play of the primary game for gaming devices 102 and 106 results in the generation of a winning symbol combination for one of the paylines. Thus, the primary game summary display areas 400 of gaming devices 102 and 106 display a message summarizing the events triggered by the winning symbol combination.

In the illustrated embodiment, primary game summary display area 400 of gaming device 102 indicates that Player A wins 10 credits for generating three sevens on payline 52B. Since Player A had 30 credits before the play of the primary game illustrated in FIG. 4B, and since Player A wagered 10 credits as indicated by the credits played display 22 and won 10 credits as indicated by the primary game summary display area 400, the number of accumulated credits display area 20 of gaming device 102 of FIG. 4B indicates that Player A has 30 credits. The primary game summary display area 400 of gaming device 102 also indicates that a collector-generation event occurs on gaming device 102. Specifically, in the illustrated embodiment, the collector-generation event associated with generating three sevens on payline 52A of gaming device 102 results in one collector. Thus, the number of collectors displayed in the number of accumulated collectors display area 306 of gaming device 102 is incremented by one for a total of one accumulated collector. In embodiment illustrated in FIG. 5B, community display 108 reflects the collector-generation event by displaying a single collector 640 in the Player A collector accumulation area 604. In a various embodiments, the location of the collector within the collector accumulation area does not impact the bonus sequence.

Likewise, primary game summary display area 400 of gaming device 106 indicates that Player C wins 100 credits for generating three apples on payline 52B. Since Player C had 200 credits before the play of the primary game illustrated in FIG. 4B, and since Player C wagered 50 credits as indicated by the credits played display 22 and won 100 credits as indicated by the primary game summary display area 400, the number of accumulated credits display area 20 of gaming device 106 indicates that Player C has 250 credits. Moreover, primary game summary display area 400 of gaming device 106 indicates that a collector-generation event results from generating three apples on payline 52B of gaming device 106. As illustrated, the collector-generation event results in the generation of five collectors, so the number of collectors displayed in the number of collectors accumulated display area 306 of gaming device 106 is incremented by five for a total of five. Finally, the accumulated collectors are displayed on the community display 108, as illustrated in FIG. 5B. In the illustrated embodiment, the gaming system displays five collectors 680 in Player C collector display area 608.

Referring again to FIG. 9, Block 1504 of timeline 1500 indicates a summary of the plays of the primary game illustrated by FIGS. 4B and 5B. After the second play of the primary game 1504, as illustrated by FIGS. 4B and 5B, a target-generation event occurs for each gaming device and a collector-generation event occurs for gaming devices 102 and 106. Thus, Player A receives one target and one collector, Player B receives two targets and zero collectors, and Player C receives five targets and five collectors.

Figure 4C:
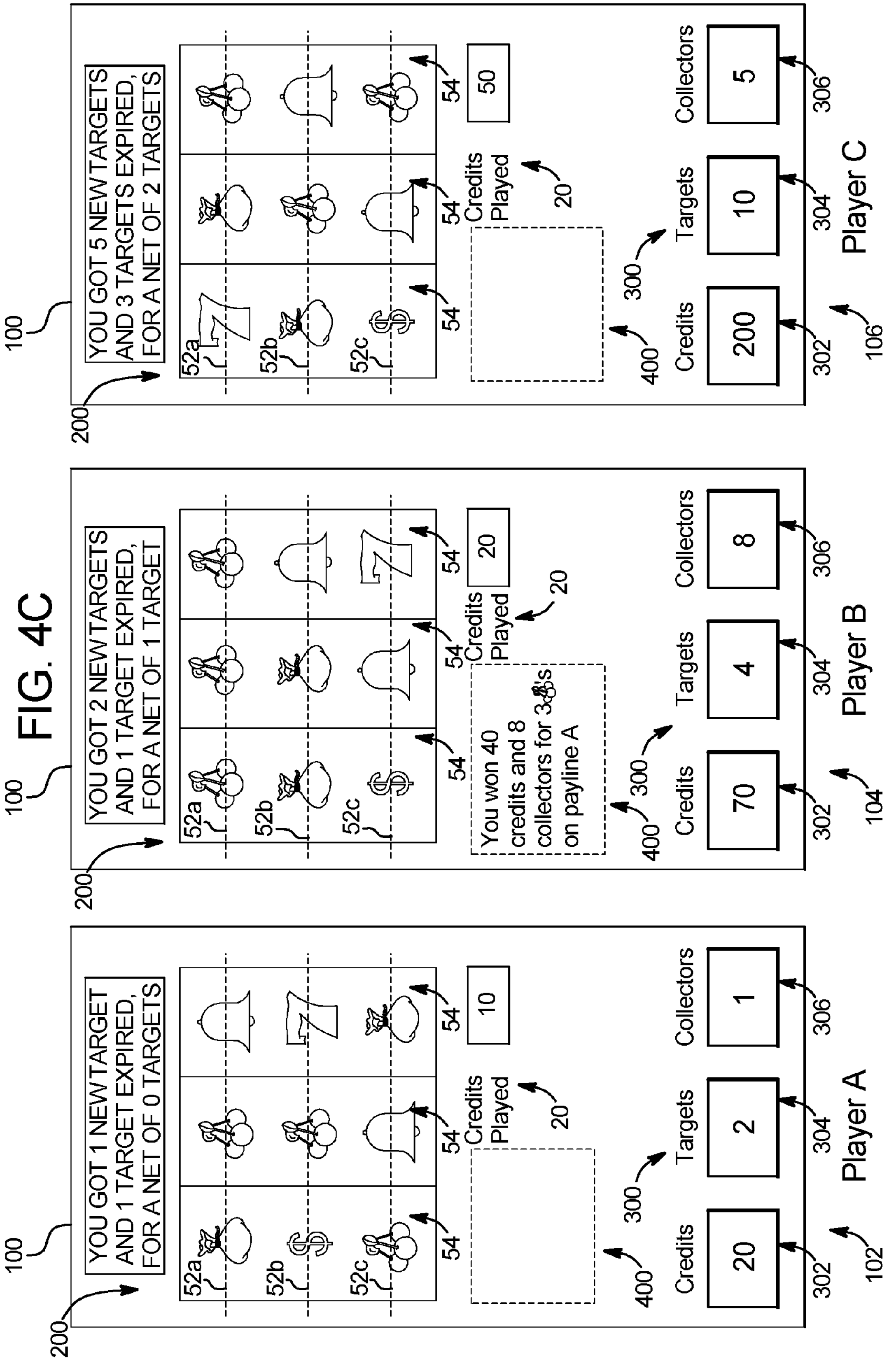
Figure 5C:
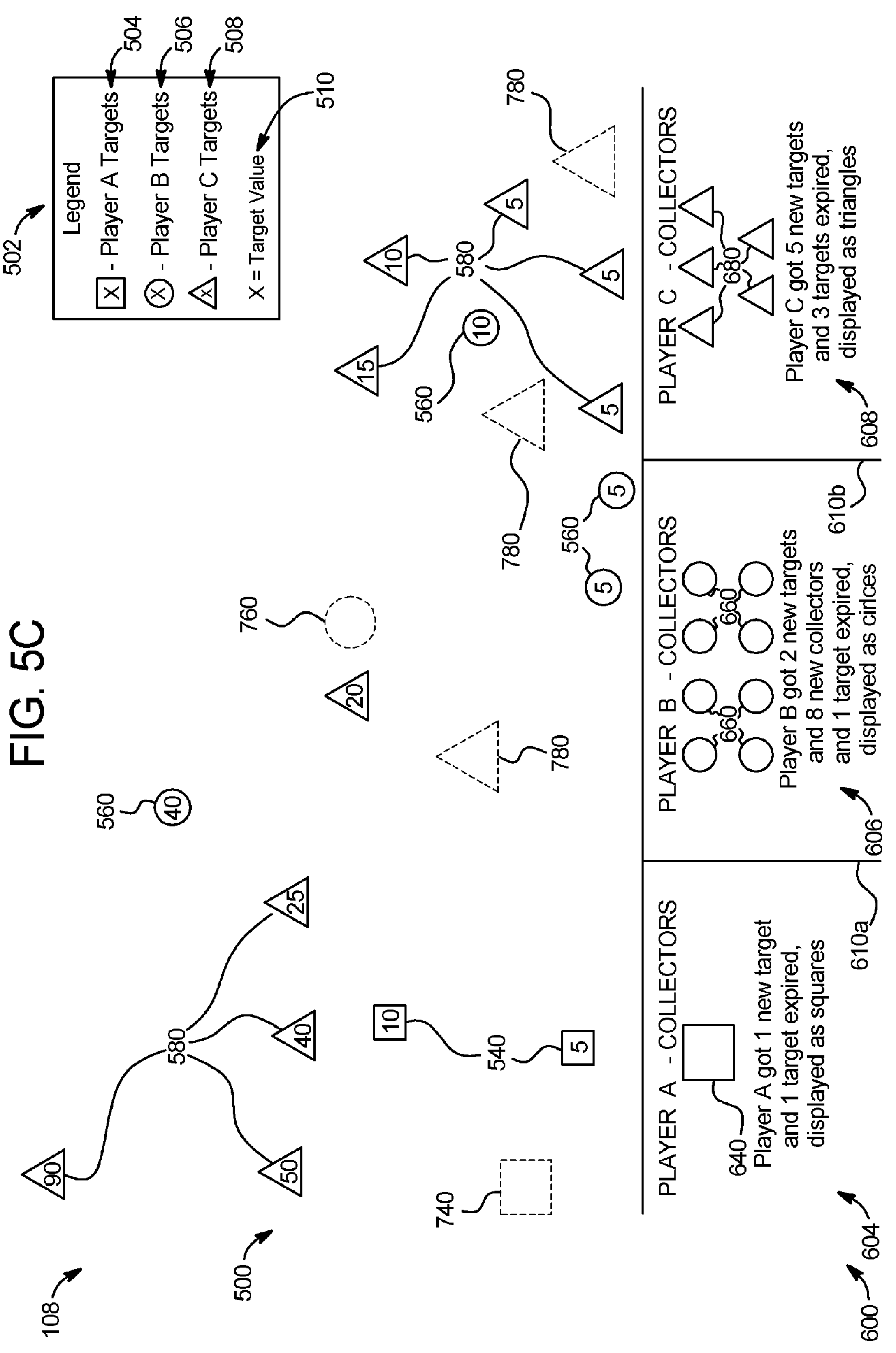

FIGS. 4C and 5C illustrate an example embodiment of the gaming devices 102, 104, and 106 and the community display 108 after a third play of the primary game of each gaming device. Prior to the play of the primary game illustrated by FIGS. 4C and 5C, the gaming devices and the community display appear as illustrated in FIGS. 4B and 5B, respectively.

As illustrated by the credits played display areas 22 of gaming device 102, 104, and 106, Player A wagered 10 credits, Player B wagered 20 credits, and Player C wagered 50 credits on a third the play of the primary game illustrated by FIGS. 4C and 5C. The target/collector status display area 100 of gaming device 102 indicates a target-generation event that results in one new target for Player A. The target/collector status display area 100 of gaming device 104 indicates a target-generation event that results in two new targets for Player B. The target/collector status display area 100 of gaming device 106 indicates a target-generation event that results in five new targets for Player C.

In certain embodiments, the targets disclosed herein exist for a finite duration. FIG. 4C illustrates that any targets resulting from a target-generation event of the first play of the primary game have expired prior to the third play of the primary game. Since, as illustrated in FIG. 4A, Player A received one target for the first play of the primary game, Player B received one target for the first play of the primary game, and Player C received three targets for the first play of the primary game, one of Player A's targets expires, one of Player B's targets expires, and three of Player C's targets expire for the third play of the primary game, illustrated by FIG. 4C. Therefore, in the illustrated embodiment, the target/collector status display area 100 for gaming device 102 indicates that one target expired, the target/collector status display area 100 for gaming device 104 indicates that one target expired, and the target/collector status display area 100 for gaming device 106 indicates that three targets expired. Because of the newly-generated targets and the expired targets, the target/collector status display areas 100 of gaming devices 102, 104, and 106 indicate that the net targets accumulated are zero targets, one target, and two targets for Players A, B, and C, respectively.

The gaming devices updates the number of targets accumulated display areas 304 of gaming devices 102, 104, and 106 to reflect these net target values, such that after the third play of the game, the number of targets accumulated display areas 304 indicate that Player A has accumulated two targets, Player B has accumulated four targets, and Player C has accumulated 10 targets.

Moreover, since neither gaming device 102 nor gaming device 104 generated a winning symbol combination in the primary game, the credits accumulated display area 20 of gaming device 102 is decremented by 10 credits to display 20 credits remaining, and the credits accumulated display area 20 of gaming device 106 is decremented by 50 credits to display 200 credits remaining.

Referring still to FIG. 4C, gaming device 104 generates a winning symbol combination along payline 52A of the primary game. Specifically, gaming device 104 generates three cherries on payline 52A, which, as indicated by primary game summary display area 400, results in an award of 40 credits. Moreover, such a winning symbol also represents a collector-generation event resulting in the generation of eight new collectors for Player B. Thus, the number displayed in the credits remaining display area 20 is incremented from 50 to 70 (i.e., 50 credits before the third play of the primary game, a wager of 20 credits on the third play, and an award of 40 credits for the third play). Moreover, the gaming device 104 increments the number of accumulated collectors display area 304 from zero to eight to represent the eight credits resulting generated as a result of the collector-generation event that occurred on the third play of the primary game.

As illustrated in FIG. 5C, the community display 108 is updated to reflect the generated and expired targets and collectors. As before, the gaming system displays targets 540 generated for Player A, targets 560 generated for Player B, and targets 580 generated for Player C in the targets accumulated display area 500. However, in the embodiment illustrated in FIG. 5C, the plurality of targets generated for the first play of the primary game at each of the gaming devices 102, 104, and 106 have been removed from the community display 108 by the gaming system disclosed. Thus, the gaming system no longer displays targets 740 generated by Player A, targets 760 generated by Player B, and targets 780 generated by Player C. As further illustrated by FIG. 5C, the gaming system disclosed displays the new collectors resulting from the collector-generation event of the third play of the primary game in the appropriate player's collector accumulation area of the collector accumulation area 600. Specifically, the gaming device displays the eight collectors 660 generated by the third play of the primary game of gaming device 104 in the Player B collector accumulation area 606.

Referring again to FIG. 9, between the second play of the primary game, as indicated by block 1504, and the third play of the primary game, as indicated by block 1506, the targets generated during the first play of the primary game, as indicated by block 1502, expire, as indicated by line 1520. During the third play of the third game 1506, as illustrated by FIGS. 4C and 5C, target-generation events occur for each gaming device and a collector-generation event occurs for gaming device 104. Thus, as illustrated, Player A receives one new target and one target from the first play expires, Player B receives two new targets and eight new collectors and one target from the first play expires, and Player C receives five new targets and three targets from the first play expire.

Figure 4D:
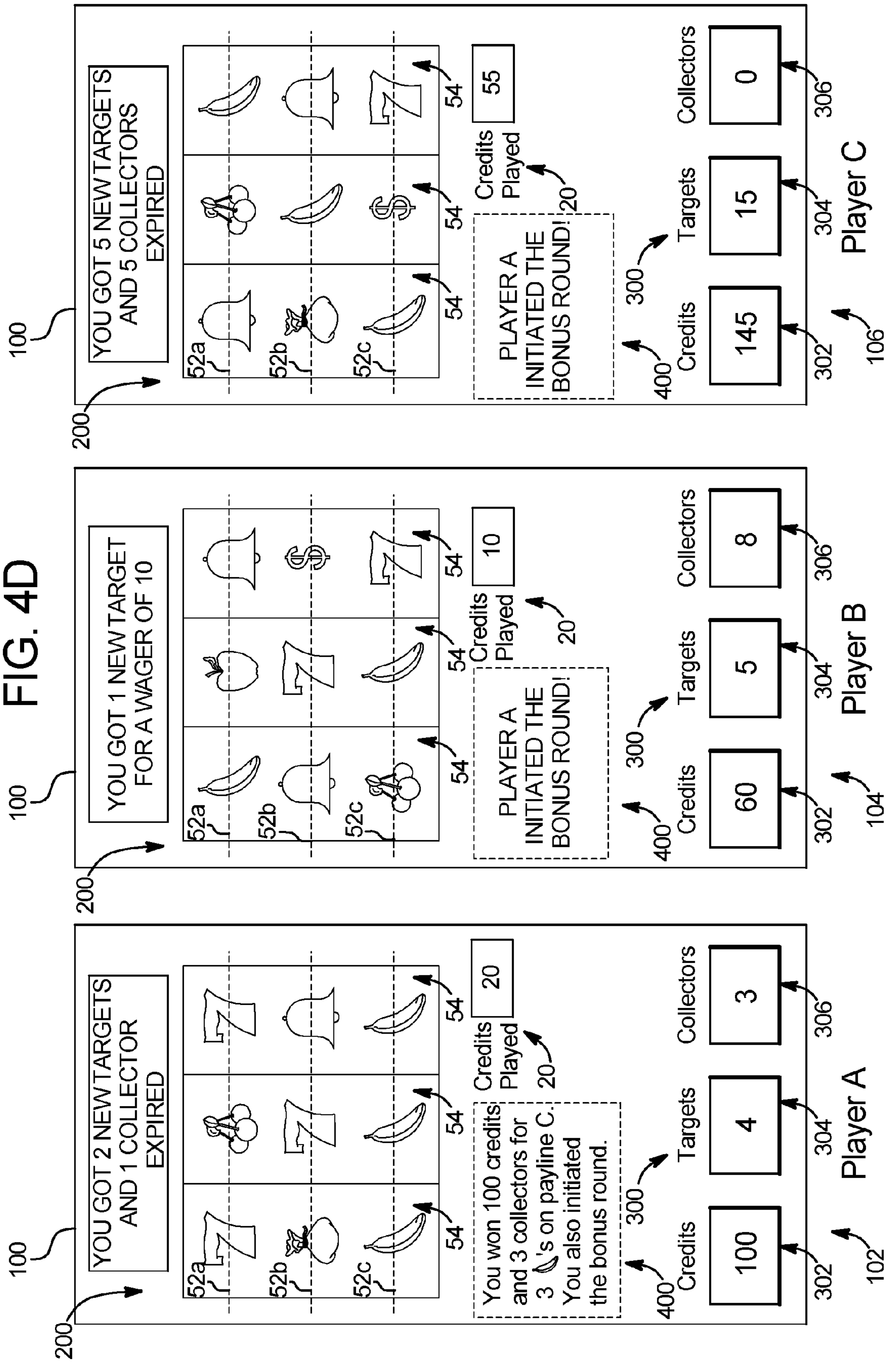
Figure 5D:
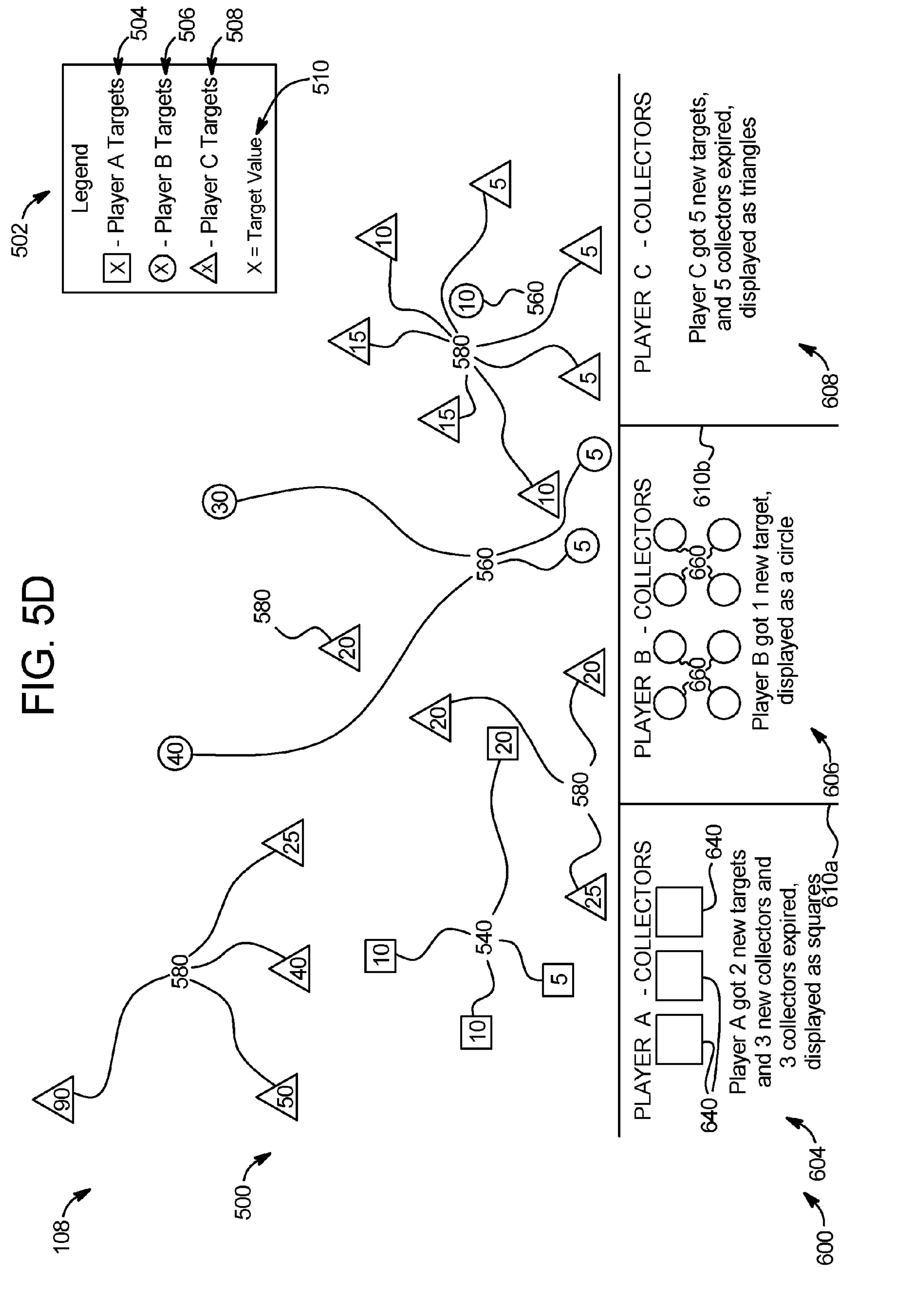

FIGS. 4D and 5D illustrate an embodiment of the gaming devices 102, 104, and 106 and the community display 108 after a fourth play of the primary game of each gaming device. Prior to the play of the primary game illustrated by FIGS. 4D and 5D, the gaming devices and the community display appear as illustrated in FIGS. 4C and 5C, respectively.

As illustrated by FIG. 4D, Player A wagered 20 credits, Player B wagered 10 credits, and Player C wagered 55 credits for the fourth play of the primary game. This results in a target-generation event for each of the gaming devices 102, 104, and 106, as illustrated in the respective target/collector status display area 100 of each gaming device. Specifically, the target-generation event of gaming device 102 results in the accumulation of two new targets and the target-generation event of gaming device 104 results in one new target. As illustrated, despite Player C wagering 55 credits for the fourth play of the game, the target-generation event for gaming device 106 results in the accumulation of five new targets. The number displayed in the target accumulation display area 304 of each gaming device is updated to reflect the newly-generated targets.

As further illustrated by FIG. 4D, the number displayed in the credits accumulated display area 20 for each of gaming devices 104 and 106 is decremented according to the wager made by each of Players B and C on the fourth play of the primary game.

As noted above and as illustrated in FIGS. 4D and 5D, collectors in one embodiment exist for a finite amount of time. In the illustrated embodiment, any collectors generated for collector-generation events occurring for the second play of the primary game (illustrated in FIGS. 4B and 5B) expired prior to the fourth play of the primary game. Thus, the target/collector status display area 100 of gaming devices 102 and 106 indicate that one collector and five collectors have expired, respectively.

As illustrated in FIG. 4D, the primary game status display area 400 of gaming device 102 also indicates that the primary game of gaming device 102 resulted in a collector-generation event for Player A. As illustrated, Player A accumulates one collector for generating three bananas on payline 52C. The gaming device adjusts the number of accumulated collectors display area 306 of each of gaming devices 102 and 106 to reflect any expired or generated collectors. Thus, the number of accumulated collectors display area 306 of gaming device 102 displays three accumulated collectors (i.e., one collector prior to the fourth play, one collector expired before the fourth play, and one collector accumulated for the fourth play). The number of accumulated collectors display area 306 of gaming device 106 displays zero accumulated collectors (i.e., five collectors prior to the fourth play, five collectors expired before to the first play, and zero collectors accumulated for the fourth play). It should be appreciated that the number displayed in number of accumulated collectors display area 306 of gaming device 104 does not change because the second play of the primary game (illustrated in FIG. 4B) at gaming device 104 did not result in a collector-generation event—thus, none of Player B's collectors have expired.

FIG. 5D illustrates the community display 108 after the fourth play of the primary game as illustrated in FIG. 4D. As illustrated by FIG. 5D, two new targets 540 are displayed for Player A, one new target 560 is displayed for Player B, and five new targets 580 are displayed for Player C in the target accumulation display area 500. As further illustrated, three total collectors 640 are displayed in the Player A collector accumulation area 604, eight total collectors 660 are displayed in the Player B collector accumulation area 606, and zero collectors are displayed in the Player C collector accumulation area 608.

As further illustrated by FIG. 4D, the gaming device 102 generates a winning combination of symbols for the fourth play of the primary game that results in a redemption event. Primary game summary display area 400 of gaming device 102 indicates that Player A has activated the bonus round based on the generation of three bananas on payline 52C. Similarly, the primary game summary display area 400 of gaming devices 104 and 106 indicates that Player A initiated the bonus round—that is, that a redemption event occurred at gaming device 102. Upon the occurrence of a redemption event, the bonus sequence begins.

Referring again to FIG. 9, between the third play of the primary game, as indicated by block 1508, and the fourth play of the primary game, as indicated by block 1508, any collectors accumulated for the second play of the primary game, as indicated by block 1504, expire, as indicated by line 1522. During the fourth play of the primary game 1508, as illustrated by FIGS. 4D and 5D, target-generation events occur for each gaming device and a collector-generation event occurs for gaming device 102. Thus, as illustrated, Player A receives one new target, accumulates three new collectors, and one collector from the second play expires, Player B receives two new targets, and Player C receives five new targets and five collectors from the second play expire.

It should be appreciated that although FIGS. 4A to 4D illustrate identical primary games for each of the three illustrated gaming devices 102, 104, and 106, the disclosed gaming system is configured to provide different primary games to one, more, or each of the gaming devices associated with the bonus redemption game. In these embodiments, each of the gaming devices is configured to generate game outcomes which can result in one or more target-generation events, collector-generation events, and redemption events.

Figure 6:
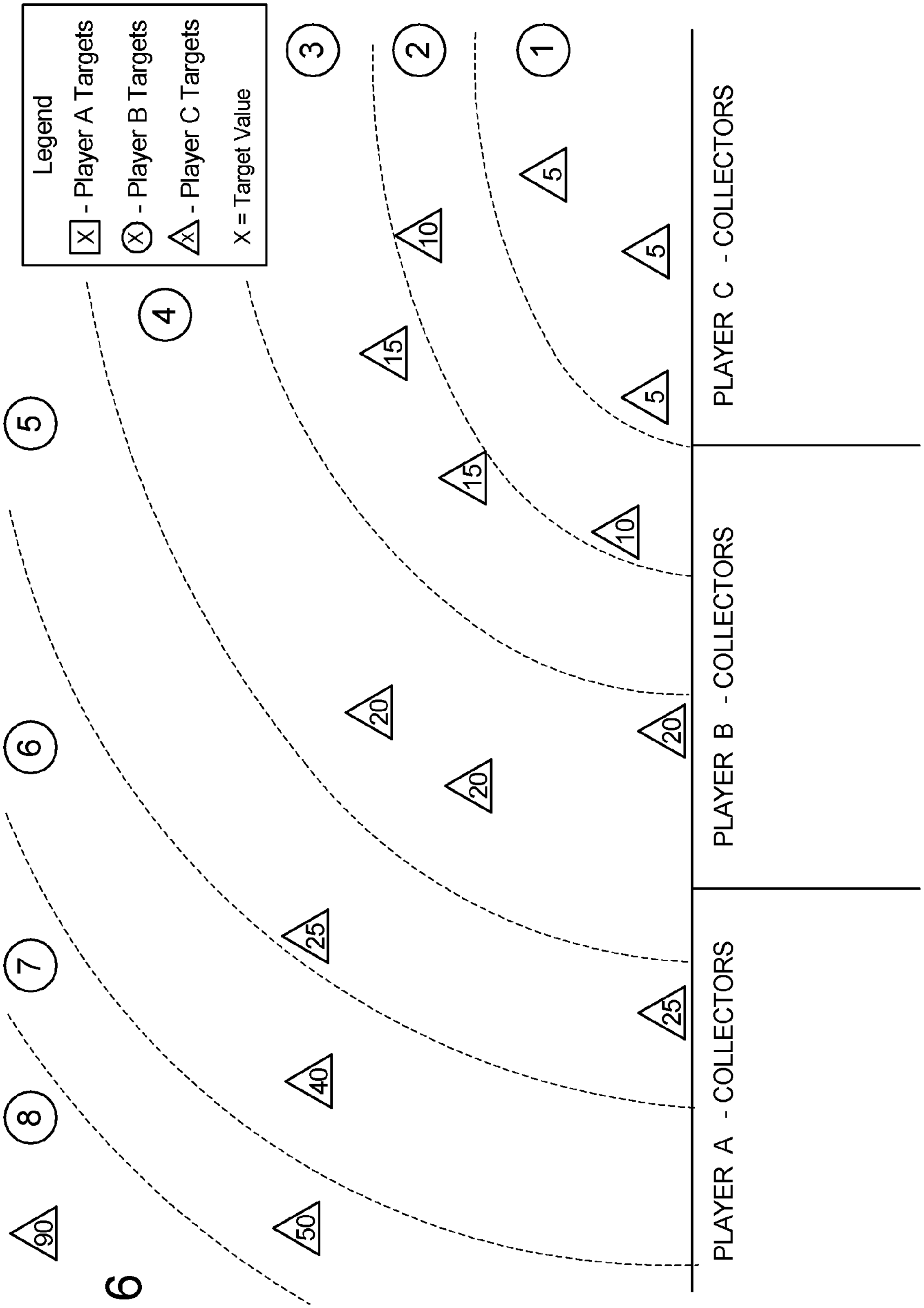
FIG. 6 is a front elevation view of the community display including an indication of an example logic for assigning target values to targets accumulated by one of the gaming devices of the disclosed gaming system.

FIG. 6 illustrates an example of a determination of a plurality of target values associated with a plurality of accumulated targets. FIG. 6 illustrates the targets generated by or for gaming device and associated with Player C after the fourth play of the primary game, discussed above and illustrated in FIG. 5D. In the illustrated embodiment, eight zones of target values are indicated, represented by numerals 1 to 8. Each target that is contained within one of the eight zones is assigned the target value of the zone. As illustrated, targets of Zone 1 are assigned a target value of five, targets of Zone 2 are assigned a target value of 10, targets of Zone 3 are assigned a target value of 15, targets of Zone 4 are assigned a target value of 20, targets of Zone 5 are assigned a target value of 25, targets of Zone 6 are assigned a target value of 40, targets of Zone 7 are assigned a target value of 50, and targets of Zone 8 are assigned a target value of 90. As illustrated, the gaming system disclosed herein generates targets randomly, but the random generation in one embodiment is weighted such that targets closer to the player's collector accumulation area (in this case, Player C), are more likely to occur. It should be appreciated that in different embodiments, targets are assigned random target values and are positioned by the gaming system on the target display area according to the randomly assigned target value. In this embodiment, the targets are assigned target values based on weighted random numbers such that any single target is more likely to be assigned a lower target value, such as a target value of five, than a higher target value, such as a target value of 90.

Figure 7:
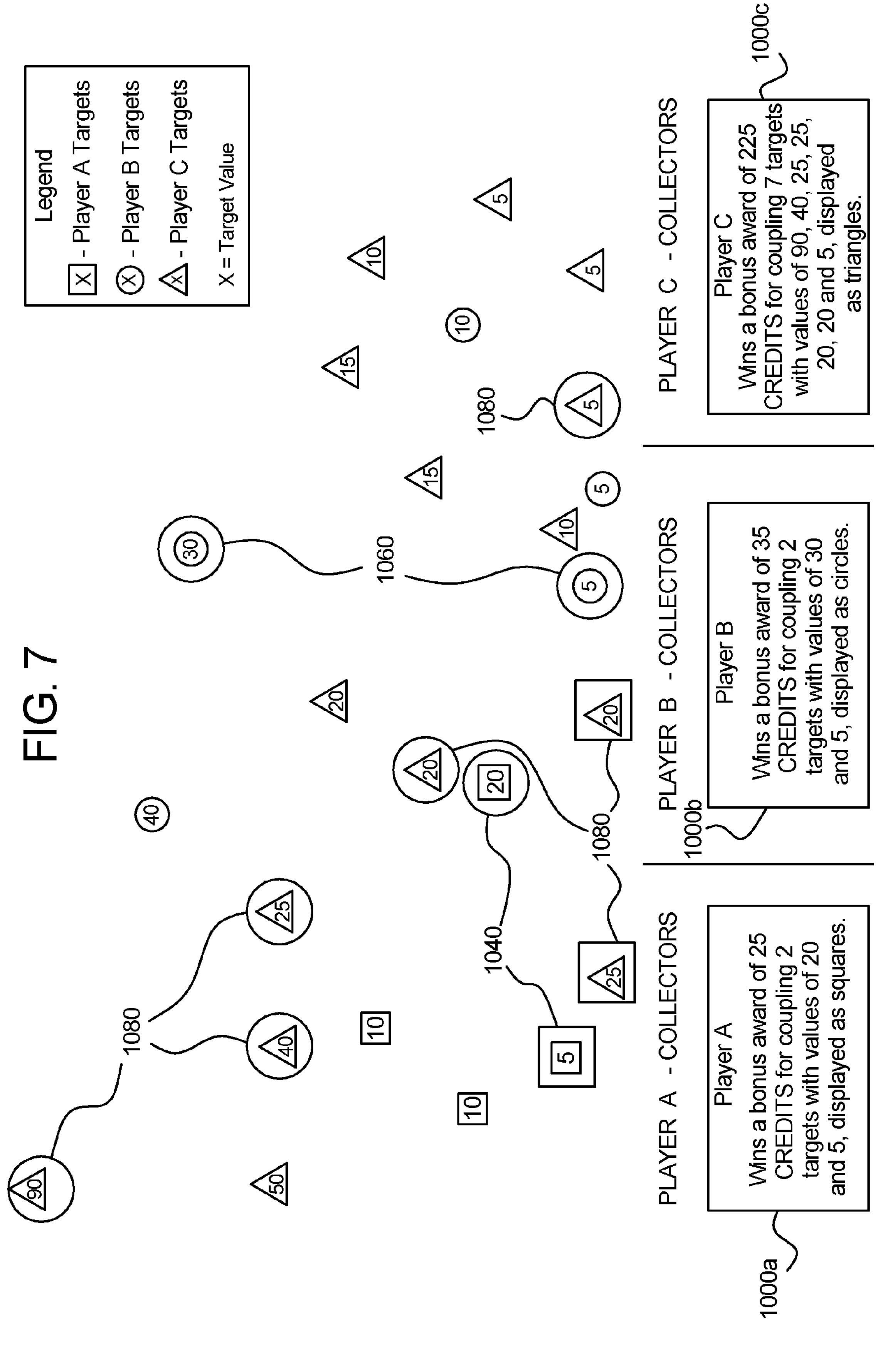
FIG. 7 is a front elevation view of the community display displaying the result of one embodiment of the bonus game disclosed herein including the accumulated targets and collectors after each collector has coupled with one of the targets as disclosed herein.

FIG. 7 illustrates an embodiment of the community display 108 of the gaming system disclosed herein after each of the collectors displayed in the collector display area 600 has coupled with a target of the target display area 500. As illustrated in FIG. 7, collectors coupled with two targets 1040 generated for Player A, collectors coupled with two targets 1060 generated for Player B, and collectors coupled with seven targets 1080 generated for Player C. In the illustrated embodiment, the community display 108 displays messages 1000 indicating the number of credits received by each player of the gaming system for participation in the bonus sequence. As illustrated by messages 100*a*, 1000*b*, and 1000*c*, Player A receives a bonus award of 25 credits, Player B receives a bonus award of 35 credits, and Player C receives a bonus award of 225 credits.

It should be appreciated that in the illustrated embodiment, each bonus award is calculated by adding the target values associated with each player's targets that coupled with any player's collector. Thus, as illustrated, though targets 1040 coupled with collectors generated for Player A and for Player B, Player A receives an award equal to the sum of the target values of both coupled targets. In different embodiments, bonus award values are calculated by adding the target values of each target for each of the collectors associated with a particular player. For instance, in one embodiment, each a player's bonus award is equal to the sum of the target values associated with each target that couples with a collector generated for that player. If the bonus award values are calculated in this way for the couplings illustrated in FIG. 7, Player A would win a bonus award of 50 credits, Player B would win a bonus award of 235 credits (not shown).

Figure 8:
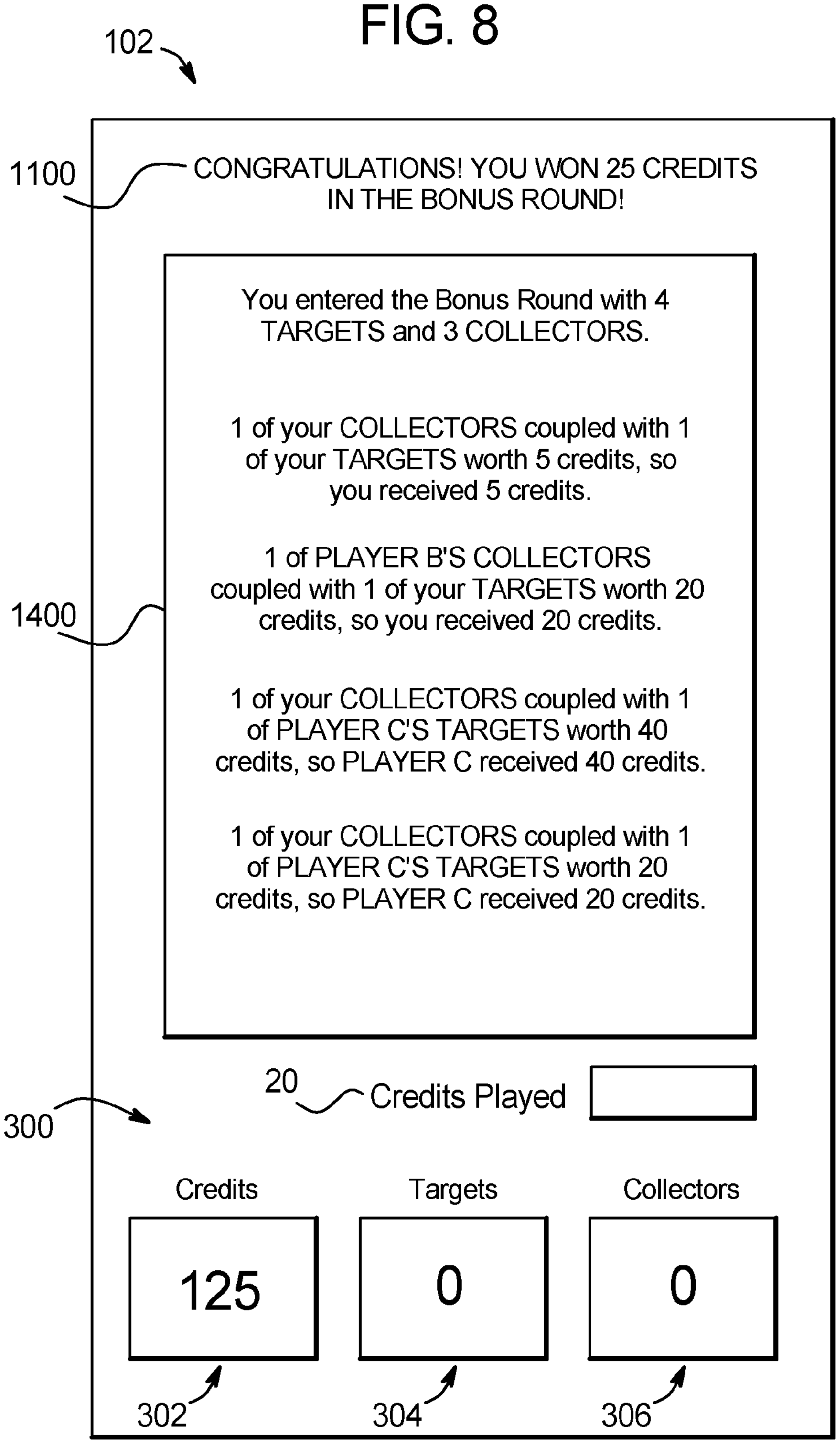
FIG. 8 is a front elevation view of one of the gaming devices of the gaming system disclosed indicating a summary of the results of one embodiment of the bonus game disclosed.

FIG. 8 illustrates an example display of gaming device 102 indicating a summary of the bonus round illustrated in FIG. 7, and including the accumulated credits, targets, and collectors for Player A following completion of the bonus round. As illustrated, the bonus credits display area 1100 of gaming device 102 indicates the credits won for Player A during the bonus round described. Since the sum of the target values of targets generated for Player A that coupled with any collector was 25, the bonus credits display area 1100 indicates that Player A won 25 credits in the bonus round.

As further illustrated by FIG. 8, the bonus round summary area 1400 indicates a player-specific summary of the events of the bonus round. In this embodiment, the gaming device displays one or more messages to the player indicating any involvement of the player's targets and/or collectors in couplings of the bonus sequence. In the illustrated embodiment, the bonus round summary area 1400 indicates that Player A entered the bonus round with four targets and three collectors, that one of Player A's collectors coupled with one of Player A's targets for which Player A received 5 credits, that one of Player B's collectors coupled with one of Player A's targets for which Player A received 20 credits, that one of Player A's collectors coupled with one of Player C's targets for which Player C received 40 credits, and that one of Player A's collectors coupled with one of Player C's targets for which Player C received 20 credits. Thus, as illustrated, the bonus round summary area 1400 summarizes the couplings resulting from each player's targets and collectors, as well as the credits associated with each coupling.

Referring still to FIG. 8, the gaming device 102 updates the real-time display area 300 of gaming device 102 to reflect the outcome of the bonus round. As illustrated, each of Player A's collectors and targets expires after completion of the bonus round, so the number of targets accumulated display area 304 and the number of collectors accumulated display area 306 display values of zero. As further illustrated, the 25 credits awarded to Player A during the bonus round are added to the number displayed in credits-remaining display area 20, resulting in a total of 125 credits for Player A. It should be appreciated that in various embodiments, one or more targets or one or more collectors that do not couple during a bonus round are retained and are eligible for use in future bonus sequences. In one embodiment, these uncoupled targets and collectors are retained for a future bonus event. In another event, these uncoupled targets and collectors expire and are ineligible for use in a future bonus event.

Referring to FIG. 9, a summary of the targets and collectors accumulated for each player of the gaming devices is illustrated on timeline 1500. Block 1510 indicates that prior to the beginning of the bonus round, Player A had four targets and three collectors, Player B had five targets and eight collectors, and Player C had 15 targets and zero collectors. Block 1512 of the timeline 1500 indicates the awards received by each player based on the couplings that occurred during the bonus round illustrated in FIGS. 6 and 7. As indicated, Player A received an award of 25 credits, Player B received an award of 35 credits, and Player C received an award of 225 credits.

In one example embodiment, targets are displayed as flowers which exist for a finite amount of time. During play of the game, the gaming system and gaming devices display the targets in various states of the life cycle of a flower, beginning with the flower blooming and ending with the flower wilting, dying, and being removed from the display device. In one example embodiment, each flower lives for one minute, so the gaming system and gaming devices display each target flower for one minute. During the one minute the gaming system displays a bloom and wilt animation sequence. In another embodiment, the life cycle of each target is randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as time of day), determined based on an amount of coin-in accumulated in one or more pools or determined based on any other suitable method or criteria. In one example embodiment, the flowers are each generated in an area of a display device representing a single field or meadow, with each player's flowers growing among the flowers of all other players. In one embodiment, a player's flowers grow most densely near a symbol or indicia displayed by the gaming system uniquely identifying a player.

In this example embodiment, the collectors are displayed as bees flying near a beehive for a finite amount of time. During play of the game, the gaming devices display the bees in various states of agitation, beginning as content and ending by becoming agitated and flying away, thus removing the collectors from the display device. In this embodiment, the gaming system displays a bee emerging from a beehive for each collector generated by a gaming device. In one example embodiment, the gaming system displays each bee for two minutes, and during the course of the two minutes the gaming system displays a linger and fly away animation sequence. In other embodiments, the life-cycle of each collector is randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. The gaming system displays a plurality of beehives of various colors, one beehive corresponding to each gaming device in the gaming system. Each bee matches the color of the beehive from which it emerges. In this example embodiment, the bees are constrained by a graphical representation of a limitation, for example, a wall or a fence. During play of the standard or base game, this limitation ensures that the bees remain in an area segregated from the flowers.

In one example embodiment, upon triggering the bonus sequence, the fence or wall around the field of flowers is removed and the bees are allowed to fly toward the flowers. In this embodiment, each bee flies among the flowers until it couples with a flower by landing on and collecting nectar from the flower. When a bee lands on a flower, the gaming device by which the bee was generated provides the player with the award associated with the flower. In this embodiment, flowers that grow farther from a player's beehive represent higher-value awards, and because of their remote location, bees land on such flowers with less regularity. In one embodiment, the bonus or secondary game continues until all the bees have landed on a flower. In another embodiment, the bonus or secondary game continues until all the bees have either landed on a flower or flown away. At the end of the bonus sequence, there are no bees remaining on the display device.

In different embodiments, any suitable objects consistent with a suitable theme can be used to represent targets and/or collectors. It should be appreciated that the appearance of the community display in different embodiments is altered based on the implemented objects representing targets and collectors. In various embodiments, the gaming system represents targets and collectors by: flowers and bees, pots of gold and leprechauns, jewels or gold and miners, treasures and pirates, cheeses and mice, or bones and dogs. In these embodiments, the community display reflects the theme—for example, if the targets are implemented as bones and the collectors are implemented as dogs, the community display in one embodiment includes a plurality of dog houses, at which dogs are generated, and a plurality of bones buried in a field, all of which are represented by the community display.

In one embodiment, the gaming system disclosed herein is configured to display a bonus sequence wherein at least one target is displayed as at least one receptacle and at least one collector is displayed as at least one falling item. In this embodiment, the gaming system discloses the receptacle at the bottom of a bonus game area and displays the falling item at the top of the bonus game area. The gaming system also displays a plurality of deflectors between the falling item and the receptacle. For a bonus sequence, the gaming system displays the falling item as being released from the top of the bonus game area. The falling item falls toward the receptacle, hitting and being deflected by one or more of the deflectors as it falls. The deflectors cause the direction and the speed of falling to change, thus impacting which (if any) of the receptacles catches the falling item. In one such embodiment, each receptacle is associated with one of the players of the gaming system, and a bonus award is provided to the players based on a quantity of falling items in the players' receptacles (i.e., as a result of catching the falling items) after the bonus sequence. In another such embodiment, the bonus award provided for a bonus sequence is based on the player with whom each falling item is associated. In another such embodiment, the bonus award is provided based on both the player with whom the receptacle is associated and on the player with whom the caught falling item is associated. It should be appreciated that the generation, display, and expiration of various receptacles and/or falling items may be performed as described herein for various embodiments of targets and collectors.

It should be appreciated that in one embodiment, the disclosed gaming system does not include a community display. In this embodiment, the gaming system is configured to display the bonus sequence on each of any gaming devices in the gaming system. In one such embodiment, the bonus sequence is displayed as identical for each gaming device. In another such embodiment, the bonus sequence is displayed such that only a portion of the bonus sequence is visible to a player at each gaming device.

In various embodiments, target-generation and/or collector-generation events occur whether or not players are making wagers on plays of the primary game. In these embodiments, targets and/or collectors are generated and displayed on the community display at a predetermined minimum rate. In various embodiments, players making wagers on plays of the game increase the rate at which targets and/or collectors are generated and displayed. It should be appreciated that by providing a minimum rate at which targets and collectors are generated, the gaming system disclosed herein increases excitement and entertainment even if a single player at a single gaming device within the gaming system is making wagers. Since each target and/or collector represents a potential future bonus award payout opportunity, the more targets and/or collectors generated and displayed by the gaming system, the more likely a player at a gaming device will receive a bonus award for a collector coupling with a target. It should be further appreciated that in various embodiments, players placing wagers on plays of the primary game of more than one of the gaming devices of the gaming system increases player excitement and enjoyment because the rate of generation of targets and collectors exceeds the minimum rates ensured by the gaming system, and thus more potential bonus award payout opportunities are available to the players of the gaming system.

In one embodiment, one or more of a target-generation event, a collector-generation event, and a redemption event occur based on a coin-in event based on the total amount of coin-in for a gaming system. In one such embodiment, the coin-in event is based on the total coin-in for one of the gaming devices of the gaming system. For example, if a gaming system is configured to accept wagers in multiples of a wager unit, the ten-thousandth wager unit at a single gaming device in one embodiment results in a coin-in event. In a different embodiment, the gaming system is configured to cause a coin-in event based on the number of wager units at all of the gaming devices of a gaming system. For example, in one embodiment, the ten-thousandth wager unit placed for any gaming device in a gaming system results in a coin-in event.

In various embodiments, target-generation events occur for gaming devices of the gaming system and/or for the gaming system as a whole. In one embodiment, targets are not associated with a single gaming device or player. In this embodiment, targets are owned by the community of gaming devices and represent potential future bonus awards for any of the gaming devices of the gaming system. In another embodiment, some of the plurality of targets are associated with a player of a gaming device in the gaming system, and some of the targets are community targets. In this embodiment, the community targets represent potential future bonus awards available to any of the players of any of the gaming devices of the gaming system, and the targets associated with a single player represent potential future bonus awards available to the player with whom the targets are associated. It should be appreciated that collectors in various embodiments are associated with a particular player or gaming device, are community collectors, or are a combination of player-specific collectors and community collectors.

In one embodiment, one or more target-generation events or collector-generation events result in the generation of a designated target or designated collector. In this embodiment, the designated target or designated collector includes additional functionality not associated with standard targets and/or standard collectors. For instance, a designated target can be especially valuable, exist for an especially long time, or result in a special bonus award. Alternatively, a designated collector can apply a multiplier to a target value, can be capable of coupling with more than one target, or can exist for an especially long time.

Various embodiments of the gaming system disclosed herein apply one or more modifiers to an award resulting from the coupling of a collector and a target. In one embodiment, the target value is modified by multiplying the target value by a player's wager. In another embodiment, the target value is hidden; in this embodiment, the value of the award resulting from the coupling of a target and a collector is revealed to the player at the time of the coupling. In another embodiment, the hidden target value is displayed to a player when a moving collector is displayed at a predetermined distance from the target. It should be appreciated that in this embodiment, the displayed movement of the collectors amongst the targets increases player excitement and enjoyment.

In different embodiments, the target value is modified based on a player ranking, modified based on a random modifier, or modified based on the total number of targets and/or collectors accumulated by a player. In one embodiment, if a coupled target and collector are generated by the same gaming device, the award provided to the player at that gaming device is enhanced such as by multiplying by a multiplier, increasing the award by a fixed amount, or some other appropriate enhancement. In a further embodiment, an award is enhanced by providing the player at the associated gaming device with one or more targets or collectors to begin the play of the primary game following the bonus sequence.

In one embodiment, certain of the collectors or targets generated by target-generation or collector-generation events occurring at a gaming device of the disclosed gaming system result in a modified target or collector. For example, a modified target in one embodiment is configured to enable a plurality of collectors to couple with it. In one embodiment, a modified collector is configured to couple with a plurality of targets during a single bonus sequence. It should be appreciated that such modified targets and collectors represent more bonus opportunities in a bonus sequence because each modified target and/or collector is capable of generating a plurality of awards based on a plurality of target values.

In one embodiment, the target value of each of the plurality of targets is randomly determined for each target. In another embodiment, each target has an identical target value. In one embodiment, each of the targets has a target value randomly selected from among a range of target values. In one embodiment, one or more targets have a changing target value. For example, one target may have a value that alternates between a low and a high value, such that the timing of a collector coupling with the target determines the target value, on which the award is based. In various embodiments, the target value associated with a target varies based on the target's appearance or based on the ranking of a player at the gaming device associated with the generated target.

In one embodiment, one or more collectors includes an associated collector value. In this embodiment, any award resulting from a coupling of a target and a collector is based in part on the collector value of the collector of the coupled target/collector pair. In a further embodiment, the value of the collector increases prior to the collector coupling with a target. In this embodiment, the longer the community displays a collector as maneuvering among the plurality of targets, the higher the collector value of the collector. It should be appreciated that this increasing collector value, on which an award is partly based, increases player excitement and anticipation.

In one embodiment, collectors are generated and displayed in a community collector accumulation area. In a further embodiment, the community collector accumulation area is displayed as moving on the community display during play of the base or primary games. It should be appreciated that in such an embodiment, the community collector accumulation area can be in a position that favors one or more players. For instance, when the community collector accumulation area moves to a position near a player's high-value targets, the gaming system is more likely to cause one or more collectors to couple with one or more of the player's high-value targets, so the excitement and enjoyment for that player is increased.

It should be appreciated that any suitable manner of determining a total award in the bonus sequence for participating gaming devices may be utilized. In one embodiment, the total award for each participating gaming device is the sum of the awards collected by or associated with the collectors of said gaming device. In another embodiment, the total award for each participating gaming device is the highest-valued award collected by or associated with a collector of said gaming device. In an alternative embodiment, the total award for each participating gaming device is the lowest-valued award collected by or associated with a collector of said gaming device. In one embodiment, the total award for each participating gaming device is the sum of awards collected by or associated with a predetermined number of collectors of the gaming device.

In various embodiments, the award provided for participation in the communal bonus sequence includes credits, currency deposited to an appropriate electronic account, discounts to one or more retail outlets, a physical prize, a progressive award, an invitation into a subsequent bonus game or tournament, or items that can be redeemed in various other bonus events such as bonus events provided by other gaming systems or table games.

In various embodiments, at least one target and/or collector is associated with a player account. In such embodiments, the target and/or collector associated with the player account results in a bonus award to the player account when the target and/or collector is coupled during a bonus sequence. In one such embodiment, if a player ceases wagering on plays of the game of one of gaming devices of the gaming system, the gaming system saves any accumulated targets and/or collectors as associated with the player's account. In this embodiment, if a player later returns to a gaming device of the gaming machine, the gaming system displays any stored accumulated targets and/or collectors and is configured to provide awards for the coupling of such targets and/or collectors during a bonus sequence. In another such embodiment, the gaming system stores the targets and/or collectors in association with the player account but does not remove them from the communal display. In this embodiment, if a stored target and/or collector is coupled during a bonus sequence, the gaming system provides an award to the player via the player's account. In this embodiment, the gaming system enables the player to win awards for participation in a bonus event even if the player was not wagering on plays of the game of any of the gaming devices of the gaming system at the time the bonus sequence occurred.

In different embodiments, the disclosed gaming system is configured to store a quantity of targets and/or collectors for a particular player based on that player's account using a player tracking system. In one embodiment, if a player stores one or more targets and/or collectors using such a player tracking system, the gaming system removes the accumulated targets and/or collectors from the communal display. In another embodiment, the gaming system continues to display one or more of the stored targets and/or collectors after the player ceases wagering on plays of the primary game.

In one embodiment, a server of the disclosed gaming system is configured to store a plurality of targets and/or collectors in association with a plurality of players. In this embodiment, the server is configured to communicate with more than one bank of gaming devices, such that targets and/or collectors generated for plays of games of a plurality of different banks of gaming devices are stored on the same server. In one such embodiment, the server is configured to cause at least one of the stored targets and/or collectors to move from a communal display of a first bank of gaming devices to a communal display of a second bank of gaming devices. It should be appreciated that in this embodiment, the gaming system is configured provide an award based on a coupling of a target and/or a collector which was generated for a gaming device of the first bank and which was moved, by the server, to a communal display of the second bank of gaming devices.

In various embodiments, the server or player tracking system stores the targets and/or collectors until the targets and/or collectors expire. Upon the expiration of the targets and/or collectors, the server or player tracking system ceases storing the targets and/or collectors and does not provide any future bonus awards based on the stored targets and/or collectors. In various embodiments, the expiration of the targets and/or collectors is predetermined, randomly determined, determined based on the player's status (such as determined through a player tracking system), determined based on a random determination by the central controller, determined based on a random determination at the gaming device, determined based on players joining or placing a first wager on a play of a primary game, determined based on the occurrence of a collector-generation event, determined based on the number of players of the gaming system, determined based on the occurrence of a redemption event, determined based on one or more side wagers placed, determined based on time (such as the time of day), determined based on an amount of coin-in accumulated in one or more pools or determined based on any other suitable method or criteria.

In one embodiment, at least a plurality of targets and/or collectors is not associated with any player at any of the gaming devices of the gaming system. In this embodiment, the at least one unassociated target and/or collector is a gaming system target and/or collector and is usable to provide a bonus award to one or more players of the gaming system. In various embodiments, the player to whom the bonus award is provided for coupled targets and collectors using one or more gaming system targets and/or collectors is predetermined, randomly determined, determined based on the player's status (such as determined through a player tracking system), determined based on a random determination by the central controller, determined based on a random determination at the gaming device, determined based on players joining or placing a first wager on a play of a primary game, determined based on the occurrence of a collector-generation event, determined based on the number of players of the gaming system, determined based on the occurrence of a redemption event, determined based on one or more side wagers placed, determined based on time (such as the time of day), determined based on an amount of coin-in accumulated in one or more pools or determined based on any other suitable method or criteria.

In one embodiment, the gaming system includes at least one gaming device at each of a plurality of gaming facilities or establishments such as a plurality of casinos. In one such embodiment, at least one gaming device is physically located at a first casino and at least one gaming device is physically located at a second casino. In various embodiments, at least one of the plurality of targets and/or collectors is usable during a bonus sequence to generate a bonus award to be provided to players in the first casino or in the second casino. In one such embodiment, a target generated by a player in the first casino is usable to generate an award for a player at the second casino. In various embodiments, at least one target and/or collector is configured to move from a first bank of gaming devices to a second bank of gaming devices, wherein each bank of gaming devices is part of the same gaming system. In this embodiment, the bonus sequence displayed for the first bank of gaming devices is different from the bonus sequence displayed for the second bank of gaming devices. In further embodiments, a bonus award is provided to at least one player of a gaming device of the first bank of gaming devices upon the occurrence of a bonus sequence at the second bank of gaming devices. In one such embodiment, a first player at the first bank wagers on a play of a primary game which results in the generation of a target, and the gaming system subsequently moves the target to the second bank. In this embodiment, a second player at the second bank wagers on a play of a primary game which results in a redemption event such that the gaming system provides a bonus sequence at the second bank. In this embodiment, a collector of the second bank couples with the target generated for the wager on the play of the game by the first player, and the gaming system provides a bonus award at least to the first player based on the coupling at the second bank.

In various embodiments, the gaming system is configured to combine more than one target to provide a combination target. In one such embodiment, an award provided based on a coupling of a collector with the combination target is larger than the award provided for any of the targets that were combined to form the combination target. For example, if two targets each having a target value of 10 combine to form a combination target, the gaming system may provide an award of 20 to a player whose collector couples with the combination target. Alternatively, the gaming system may provide an award greater than the sum of the target values, such as an award of 30, to a player whose collector couples with the combination target. In a similar embodiment, the gaming system is configured to combine more than one collector to create a combination collector. In various embodiments, each of the players for whom one of the generated targets or collectors which was combined to form a combination target or collector, respectively, is provided a bonus award upon coupling of the combination target or collector.

In one embodiment, the gaming system is configured to provide a plurality of players whose targets and/or collectors have combined to create a combined target and/or collector with an award if the combined targets and/or collectors couple during a bonus sequence. In one such embodiment, each player whose target and/or collector comprises a portion of the combined target and/or collector may receive an award based on the value associated with that player's target and/or collector's contribution to the combination target and/or collector. In various embodiments, the portion of the award provided to each player is predetermined, randomly determined, determined based on the player's status (such as determined through a player tracking system), determined based on a random determination by the central controller, determined based on a random determination at the gaming device, determined based on players joining or placing a first wager on a play of a primary game, determined based on the occurrence of a collector-generation event, determined based on the number of players of the gaming system, determined based on the occurrence of a redemption event, determined based on one or more side wagers placed, determined based on time (such as the time of day), determined based on an amount of coin-in accumulated in one or more pools or determined based on any other suitable method or criteria.

In various embodiments, stored targets and/or collectors impact future target-generation events, collector-generation events, and/or redemption events. For example, if a player has a designated quantity of stored targets, the gaming system may be more likely to determine that a primary game outcome for a primary game played by that player results in a redemption event. In various embodiments, the gaming system generates targets and/or collectors based, in part, on characteristics of a player's account. For example, if a player is rated above a certain threshold, the gaming system may generate targets and/or collectors for that player at a higher rate than for a player rated below a certain threshold.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A gaming system comprising:

a plurality of gaming devices, each gaming device including:

at least one display device, at least one input device, at least one processor, and at least one memory device which stores a plurality of instructions, which when executed by the at least one processor, cause the at least one processor to operate with the at least one display device and the at least one input device; and a controller programmed to operate with said gaming devices to:

(a) generate a plurality of targets, (b) associate at least one of the plurality of generated targets with a first one of the gaming devices, (c) generate a plurality of collectors, (d) associate at least one of the plurality of generated collectors with a second one of the gaming devices, and (e) after associating at least one of the plurality of generated targets with the first one of the gaming devices, after associating at least one of the plurality of generated collectors with the second one of the gaming devices and upon an occurrence of a redemption event:

(i) randomly couple at least one of the generated targets with at least one of the generated collectors, (ii) display said random coupling, and (iii) cause at least one award to be displayed and provided, wherein said at least one award is based on the random coupling of the at least one generated target and the at least one generated collector.

2. The gaming system of claim 1, wherein the controller is programmed to operate with said gaming devices to display at least one of: at least one of the plurality of generated targets and at least one of the plurality of generated collectors for a designated amount of time.

3. The gaming system of claim 1, wherein the controller is programmed to operate with said gaming devices to display at least one of: at least one of the plurality of generated targets and at least one of the plurality of generated collectors for a designated quantity of plays of a game.

4. The gaming system of claim 1, wherein the controller is programmed to operate with said gaming devices to display at least one of: at least one of the plurality of generated targets and at least one of the plurality of generated collectors for a designated quantity of occurrences of the redemption event.

5. The gaming system of claim 1, wherein if the generated target associated with the first one of the gaming devices couples with the generated collector associated with the second one of the gaming devices, the controller is programmed to operate with said gaming devices to cause the at least one award to be provided to a player at the first gaming device.

6. The gaming system of claim 1, wherein if the generated target associated with the first one of the gaming devices couples with the generated collector associated with the second one of the gaming devices, the controller is programmed to operate with said gaming devices to cause the at least one award to be provided to a player at the second gaming device.

7. The gaming system of claim 1, wherein upon the occurrence of the redemption event, the controller is programmed to operate with said gaming devices to randomly couple a first one of the plurality of generated targets with a first one of the plurality of generated collectors based on a first probability associated with one of: the first one of the generated targets and the first one of the generated collectors.

8. The gaming system of claim 1, wherein the controller is programmed to operate with said gaming devices to randomly couple each of the plurality of generated collectors with a different one of the plurality of generated targets.

9. The gaming system of claim 1, wherein the first one of the gaming devices and the second one of the gaming devices are the same gaming device.

10. The gaming system of claim 1, wherein the first one of the gaming devices is physically located in a first gaming establishment and wherein the second one of the gaming devices is physically located in a second gaming establishment.

11. The gaming system of claim 1, wherein at least one of the plurality of generated targets is generated by one of the plurality of gaming devices.

12. The gaming system of claim 1, wherein at least one of the plurality of generated collectors is generated by one of the plurality of gaming devices.

13. The gaming system of claim 1, wherein the controller is programmed to operate with said gaming devices to associate at least one of the plurality of generated targets with a first player wagering on plays of a game of the first one of the gaming devices after the first player ceases wagering on plays of the game of the first gaming device.

14. The gaming system of claim 1, wherein the controller is programmed to operate with said gaming devices to generate a plurality of targets based on a player account.

15. The gaming system of claim 7, wherein the first probability is based on at least one selected from the group consisting of: a target value of the first one of the generated targets, a collector value of the first one of the generated collectors, a displayed location of the first one of the generated targets, and a displayed location of the first one of the generated collectors.

16. The gaming system of claim 7, wherein upon the occurrence of the redemption event, the controller is programmed to operate with said gaming devices to randomly couple a second different one of the plurality of generated targets with a second different one of the plurality of generated collectors based on a second different probability associated with at least one of: the second different one of the generated targets and the second different one of the generated collectors.

17. The gaming system of claim 13, wherein the controller is programmed to operate with said gaming devices to associate at least one of the plurality of generated collectors with a second player wagering on plays of a game of the second one of the gaming devices after the second player ceases wagering on plays of the game of the second gaming device.

18. The gaming system of claim 14, wherein the controller is programmed to operate with said gaming devices to generate a plurality of collectors based on a player account.

19. A gaming system comprising:

a plurality of gaming devices, each gaming device including:

at least one display device, at least one input device, at least one processor, and at least one memory device which stores a plurality of instructions, which when executed by the at least one processor, cause the at least one processor to operate with the at least one display device and the at least one input device; and a controller programmed operate with the plurality of gaming devices to:

(a) cause a target-generation event to occur, said target-generation event resulting in a generation of a plurality of displayed targets, each of said targets having a target value, (b) associate at least one of the generated targets with a first one of the gaming devices, (c) cause a collector-generation event to occur, said collector-generation event resulting in a generation of a plurality of displayed collectors, (d) associate at least one of the generated collectors with a second one of the gaming devices, (e) determine if a redemption event occurs, and (f) if the redemption event occurs, for at least one generated target:

(i) randomly couple said target with at least one of said generated collectors, said random coupling occurring after at least one of the generated targets is associated with the first one of the gaming devices and after at least one of the generated collectors is associated with the second one of the gaming devices, (ii) cause a display of said coupled target and collector, and (iii) cause at least one award to be provided, said at least one award based on the target value of said target.

20. The gaming system of claim 19, wherein the controller is programmed to operate with said gaming devices to display at least one of: at least one of the plurality of generated targets and at least one of the plurality of generated collectors for a designated amount of time.

21. The gaming system of claim 19, wherein the controller is programmed to operate with said gaming devices to display at least one of: at least one of the plurality of generated targets and at least one of the plurality of generated collectors for a designated quantity of plays of a game.

22. The gaming system of claim 19, wherein the controller is programmed to operate with said gaming devices to display at least one of: at least one of the plurality of generated targets and at least one of the plurality of generated collectors for a designated quantity of occurrences of the redemption event.

23. The gaming system of claim 19, wherein the controller is programmed to operate with said gaming devices to provide said at least one award to a player of the gaming device associated with the coupled target.

24. The gaming system of claim 19, wherein the controller is programmed to operate with said gaming devices to provide said at least one award to a player of the gaming device associated with the coupled collector.

25. The gaming system of claim 19, wherein at least one of the events selected from the group consisting of: the target-generation event, the collector-generation event, and the redemption event occurs based on a play of a primary game of one of the gaming devices.

26. The gaming system of claim 19, wherein at least one of the events selected from the group consisting of: the target-generation event, the collector-generation event, and the redemption event, occurs independently of a play of a primary game of any of the gaming devices.

27. The gaming system of claim 19, wherein at least one of the coupled collectors includes a collector value and wherein said at least one award is based on the collector value of the coupled collector.

28. The gaming system of claim 19, wherein the first one of the gaming devices is physically located in a first gaming establishment and wherein the second one of the gaming devices is physically located in a second gaming establishment.

29. The gaming system of claim 19, wherein at least one of the plurality of generated targets is generated by one of the plurality of gaming devices.

30. The gaming system of claim 19, wherein at least one of the plurality of generated collectors is generated by one of the plurality of gaming devices.

31. The gaming system of claim 19, wherein the controller is programmed to operate with said gaming devices to associate at least one of the plurality of generated targets with a first player wagering on plays of a game of the first one of the gaming devices after the first player ceases wagering on plays of the game of the first gaming device.

32. The gaming system of claim 19, wherein the controller is programmed to operate with said gaming devices to generate a plurality of targets based on a player account.

33. The gaming system of claim 31, wherein the controller is programmed to operate with said gaming devices to associate at least one of the plurality of generated collectors with a second player wagering on plays of a game of the second one of the gaming devices after the second player ceases wagering on plays of the game of the second gaming device.

34. The gaming system of claim 32, wherein the controller is programmed to operate with said gaming devices to generate a plurality of collectors based on a player account.

35. A method of operating a gaming system, said method comprising:

(a) causing at least one processor to execute a plurality of instructions to generate a plurality of targets;

(b) causing the at least one processor to execute the plurality of instructions to associate at least one of the plurality of generated targets with a first one of a plurality of gaming devices;

(c) causing the at least one processor to execute the plurality of instructions to generate a plurality of collectors;

(d) causing the at least one processor to execute the plurality of instructions to associate at least one of the plurality of generated collectors with a second one of the plurality of gaming devices; and (e) after associating at least one of the plurality of generated targets with the first one of the gaming devices, after associating at least one of the plurality of generated collectors with the second one of the gaming devices and upon an occurrence of a redemption event:

(i) causing the at least one processor to execute the plurality of instructions to randomly couple at least one of the generated targets with at least one of the generated collectors, (ii) causing at least one display device to display said random coupling, (iii) causing the at least one display device to display at least one award, wherein said at least one award is based on the random coupling of the at least one generated target and the at least one generated collector, and (iv) causing the at least one award to be provided.

36. The method of claim 35, which includes causing the at least one display device to display at least one of: at least one of the plurality of generated targets and at least one of the plurality of generated collectors for a designated amount of time.

37. The method of claim 35, which includes causing the at least one display device to display at least one of: at least one of the plurality of generated targets and at least one of the plurality of generated collectors for a designated quantity of plays of a game.

38. The method of claim 35, which includes causing the at least one display device to display at least one of: at least one of the plurality of generated targets and at least one of the plurality of generated collectors for a designated quantity of occurrences of the redemption event.

39. The method of claim 35, which includes, if the generated target associated with the first one of the gaming devices couples with the generated collector associated with the second one of the gaming devices, causing the at least one award to be provided to a player at the first gaming device.

40. The method of claim 35, which includes, if the generated target associated with the first one of the gaming devices couples with the generated collector associated with the second one of the gaming devices, causing the at least one award to be provided to a player at the second gaming device.

41. The method of claim 35, which includes, upon the occurrence of the redemption event, causing the at least one processor to execute the plurality of instructions to randomly couple a first one of the plurality of generated targets with a first one of the plurality of generated collectors based on a first probability associated with one of: the first one of the generated targets and the first one of the generated collectors.

42. The method of claim 35, which includes causing the at least one processor to execute the plurality of instructions to randomly couple each of the plurality of generated collectors with a different one of the plurality of generated targets.

43. The method of claim 35, wherein the first one of the gaming devices and the second one of the gaming devices are the same gaming device.

44. The method of claim 35, which includes causing the at least one processor to execute the plurality of instructions to associate at least one of the plurality of generated targets with a first player wagering on plays of a game of the first one of the gaming devices after the first player ceases wagering on plays of the game of the first gaming device.

45. The method of claim 35, which includes causing the at least one processor to execute the plurality of instructions to generate a plurality of targets based on a player account.

46. The method of claim 41, wherein the first probability is based on at least one selected from the group consisting of: a target value of the first one of the generated targets, a collector value of the first one of the generated collectors, a displayed location of the first one of the generated targets, and a displayed location of the first one of the generated collectors.

47. The method of claim 41, which includes, upon the occurrence of the redemption event, causing the at least one processor to execute the plurality of instructions to randomly couple a second different one of the plurality of generated targets with a second different one of the plurality of generated collectors based on a second different probability associated with at least one of: the second different one of the generated targets and the second different one of the generated collectors.

48. The method of claim 44, which includes causing the at least one processor to execute the plurality of instructions to associate at least one of the plurality of generated collectors with a second player wagering on plays of a game of the second one of the gaming devices after the second player ceases wagering on plays of the game of the second gaming device.

49. The method of claim 45, which includes causing the at least one processor to execute the plurality of instructions to generate a plurality of collectors based on a player account.

50. The method of claim 35, which is operated through a data network.

51. The method of claim 50, wherein said data network is an internet.

52. A method of operating a gaming system, said method comprising:

(a) causing at least one processor to execute a plurality of instructions to cause a target-generation event to occur, said target-generation event resulting in a generation of a plurality of displayed targets, each of said targets having a target value;

(b) causing the at least one processor to execute the plurality of instructions to associate at least one of the generated targets with a first one of the gaming devices;

(c) causing the at least one processor to execute the plurality of instructions to cause a collector-generation event to occur, said collector-generation event resulting in a generation of a plurality of displayed collectors;

(d) causing the at least one processor to execute the plurality of instructions to associate at least one of the generated collectors with a second one of the gaming devices;

(e) causing the at least one processor to execute the plurality of instructions to determine if a redemption event occurs; and (f) if the redemption event occurs, for at least one generated target:

(i) causing the at least one processor to execute the plurality of instructions to randomly couple said target with at least one of said generated collectors, said random coupling occurring after at least one of the generated targets is associated with the first one of the gaming devices and after at least one of the generated collectors is associated with the second one of the gaming devices, (ii) causing at least one display device to display of said coupled target and collector, and (iii) providing at least one award, said at least one award based on the target value of said target.

53. The method of claim 52, which includes causing the at least one display device to display least one of: at least one of the plurality of generated targets and at least one of the plurality of generated collectors for a designated amount of time.

54. The method of claim 52, which includes causing the at least one display device to display at least one of: at least one of the plurality of generated targets and at least one of the plurality of generated collectors for a designated quantity of plays of a game.

55. The method of claim 52, which includes causing the at least one display device to display at least one of: at least one of the plurality of generated targets and at least one of the plurality of generated collectors for a designated quantity of occurrences of the redemption event.

56. The method of claim 52, which includes providing said at least one award to a player of the gaming device associated with the coupled target.

57. The method of claim 52, which includes providing said at least one award to a player of the gaming device associated with the coupled collector.

58. The method of claim 52, wherein at least one of the events selected from the group consisting of: the target-generation event, the collector-generation event, and the redemption event occurs based on a play of a primary game of one of the gaming devices.

59. The method of claim 52, wherein at least one of the events selected from the group consisting of: the target-generation event, the collector-generation event, and the redemption event occurs independently of a play of a primary game of any of the gaming devices.

60. The method of claim 52, wherein at least one of the coupled collectors includes a collector value and wherein said at least one award is based on the collector value of the coupled collector.

61. The method of claim 52, which includes causing the at least one processor to execute the plurality of instructions to associate at least one of the plurality of generated targets with a first player wagering on plays of a game of the first one of the gaming devices after the first player ceases wagering on plays of the game of the first gaming device.

62. The method of claim 52, which includes causing the at least one processor to execute the plurality of instructions to generate a plurality of targets based on a player account.

63. The method of claim 52, which is operated through a data network.

64. The method of claim 61, which includes causing the at least one processor to execute the plurality of instructions to associate at least one of the plurality of generated collectors with a second player wagering on plays of a game of the second one of the gaming devices after the second player ceases wagering on plays of the game of the second gaming device.

65. The method of claim 62, which includes causing the at least one processor to execute the plurality of instructions to generate a plurality of collectors based on a player account.

66. The method of claim 63, wherein said data network is an internet.

* * * * *

UNITED STATES PATENT AND TRADEMARK OFFICE

CERTIFICATE OF CORRECTION

PATENT NO. : 8,118,666 B2
APPLICATION NO. : 12/173604
DATED : February 21, 2012
INVENTOR(S) : Mark C. Nicely et al.

It is certified that error appears in the above-identified patent and that said Letters Patent is hereby corrected as shown below:

In Claim 5, Column 46, Line 65, between “first” and “gaming” insert --one of the--, and replace “device” with --devices--.

In Claim 6, Column 47, Line 4, between “second” and “gaming” insert --one of the--, and replace “device” with --devices--.

In Claim 9, Column 47, Line 18, replace “the” with --a--, between “same” and “gaming” insert --one of the--, and replace “device” with --devices--.

In Claim 18, Column 47, Line 62, replace the second instance of “a” with --the--.

In Claim 31, Column 49, Line 22, between “first” and “gaming” insert --one of the--, and replace “device” with --devices--.

In Claim 33, Column 49, Line 31, between “second” and “gaming” insert --one of the--, and replace “device” with --devices--.

In Claim 34, Column 49, Line 34, replace the second instance of “a” with --the--.

In Claim 39, Column 50, Line 19, between “first” and “gaming” insert --one of the--, and replace “device” with --devices--.

In Claim 40, Column 50, Line 24, between “second” and “gaming” insert --one of the--, and replace “device” with --devices--.

In Claim 43, Column 50, Line 39, replace “the” with --a--, between “same” and “gaming” insert --one of the--, and replace “device” with --devices--.

Signed and Sealed this
Twenty-ninth Day of May, 2012

David J. Kappos
*Director of the United States Patent and Trademark Office*

IN THE CLAIMS:

In Claim 49, Column 51, Line 6, replace the second instance of “a” with --the--.

In Claim 52, Column 51, Line 42, replace “display of said” with --display said--.

In Claim 61, Column 52, Line 33, between “first” and “gaming” insert --one of the--, and replace “device” with --devices--.

In Claim 64, Column 52, Line 44, between “second” and “gaming” insert --one of the--.

In Claim 64, Column 52, Line 45, replace “device” with --devices--.

In Claim 65, Column 52, Line 48, replace the second instance of “a” with --the--.